(12) United States Patent
Shepelev

(10) Patent No.: US 10,379,688 B2
(45) Date of Patent: Aug. 13, 2019

(54) TRANSCAPACITIVE MATRIX SENSOR WITH VIA ROUTING

(71) Applicant: SYNAPTICS INCORPORATED, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/623,086

(22) Filed: Jun. 14, 2017

(65) Prior Publication Data

US 2018/0364830 A1    Dec. 20, 2018

(51) Int. Cl.
*G06F 3/044*    (2006.01)
*G06F 3/041*    (2006.01)

(52) U.S. Cl.
CPC ............ *G06F 3/044* (2013.01); *G06F 3/0412* (2013.01); *G06F 3/0416* (2013.01); *G06F 2203/04104* (2013.01); *G06F 2203/04107* (2013.01)

(58) Field of Classification Search
CPC ............... G06F 3/044; G06F 3/0416; G06F 2203/04112; G06F 2203/04104; G06F 2203/04108
See application file for complete search history.

(56) References Cited

U.S. PATENT DOCUMENTS

| | | | |
|---|---|---|---|
| 2010/0292945 A1* | 11/2010 | Reynolds | G06F 3/044 702/65 |
| 2012/0218799 A1 | 8/2012 | Furukawa et al. | |
| 2014/0226083 A1 | 8/2014 | Dunphy et al. | |
| 2015/0042599 A1 | 2/2015 | Lukanc et al. | |
| 2015/0042600 A1 | 2/2015 | Lukanc et al. | |
| 2015/0084876 A1 | 3/2015 | Schwartz | |
| 2015/0130753 A1 | 5/2015 | Woo et al. | |
| 2015/0261377 A1 | 9/2015 | Reynolds et al. | |
| 2016/0026291 A1 | 1/2016 | Zhao et al. | |
| 2016/0291721 A1 | 10/2016 | Shepelev et al. | |
| 2017/0061188 A1 | 3/2017 | Kremin et al. | |

OTHER PUBLICATIONS

International Search Report and Written Opinion PCT/US2018/036082 dated Sep. 28, 2018, consists of 9 pages.

* cited by examiner

*Primary Examiner* — Liliana Cerullo
(74) *Attorney, Agent, or Firm* — Patterson + Sheridan, LLP

(57) ABSTRACT

Disclosed herein include a processing system, an input device, and methods for transcapacitive sensing. In one example, a processing system is configured to reduce the capacitive coupling between sensor electrodes arranged in a column of sensor electrodes and routing traces running below the sensor electrodes by isolating a receiver electrode selected from the sensor electrodes in the column from the other sensor electrodes in the column by applying a signal that is not modulated relative to the receiver electrode on sensor electrodes that are immediately adjacent the receiver electrode and not being utilized as a transmitter electrode.

18 Claims, 18 Drawing Sheets

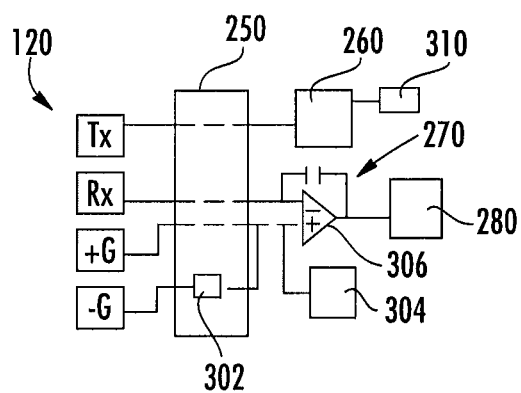
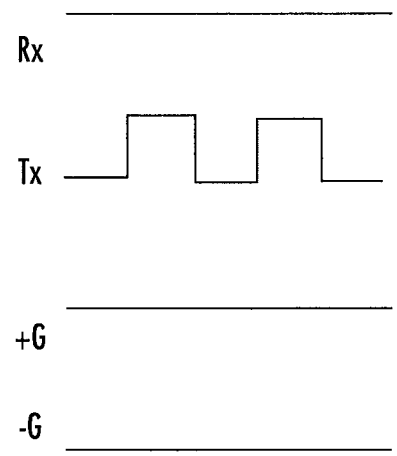
FIG. 3
FIG. 4
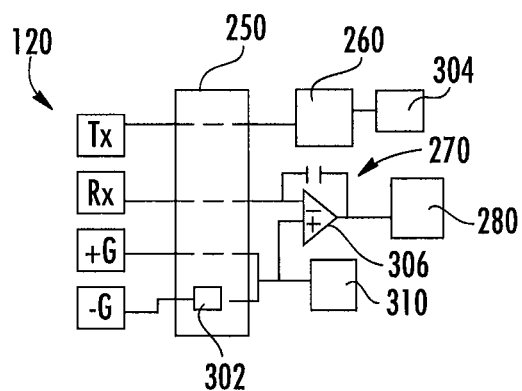
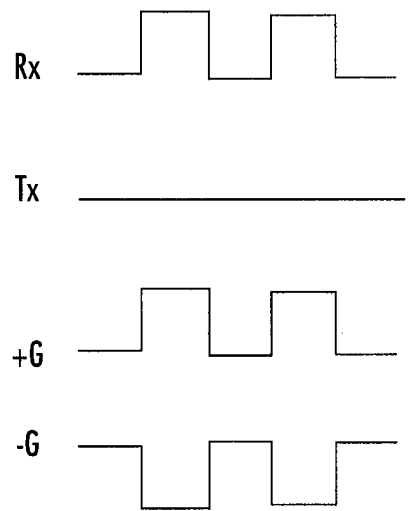
FIG. 5
FIG. 6

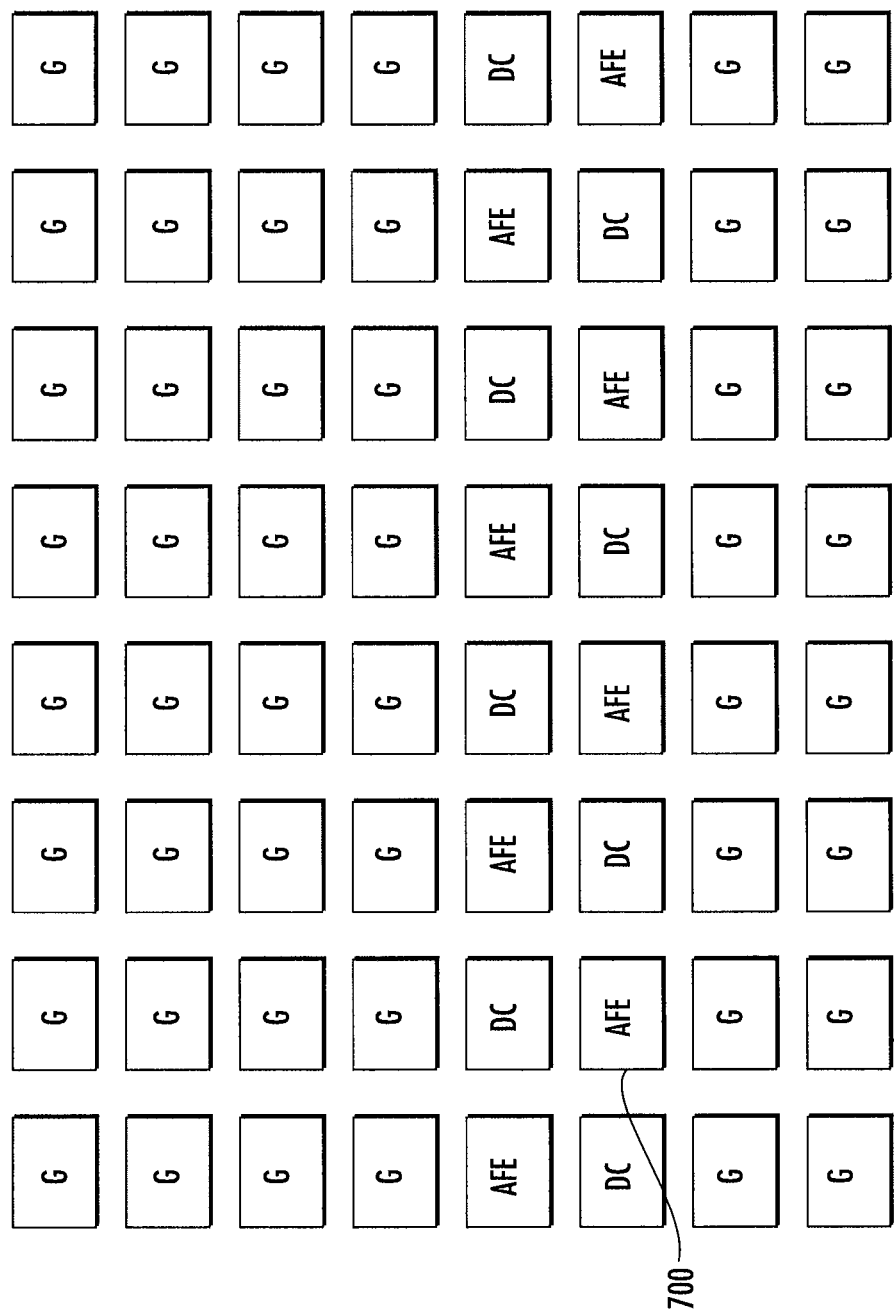

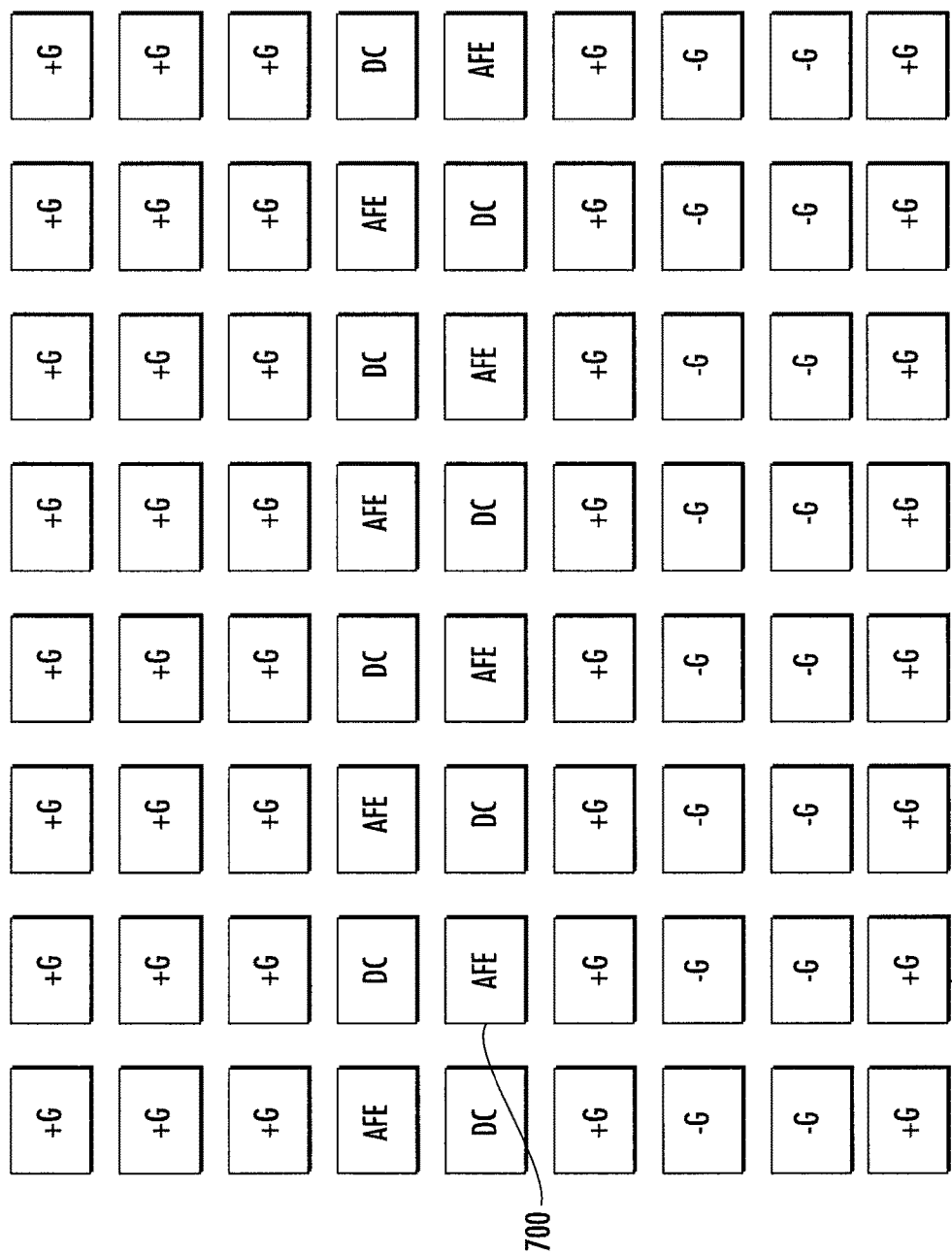

FIG. 9E

TRANSCAPACITIVE MATRIX SENSOR WITH VIA ROUTING

BACKGROUND OF THE INVENTION

Field of the Invention

Embodiments of the present invention generally relate to a method and apparatus for touch sensing, and more specifically, a capacitive touch sensing device having an array of sensor electrodes with underlying routing traces for improved transcapacitive sensing, and methods for using the same.

Description of the Related Art

Input devices including proximity sensor devices (also commonly called touchpads or touch sensor devices) are widely used in a variety of electronic systems. A touch sensor device typically includes a sensing region, often demarked by a surface, in which the touch sensor device determines the presence, location and/or motion of one or more input objects. Touch sensor devices may be used to provide interfaces for the electronic system. For example, touch sensor devices are often used as input devices for larger computing systems (such as opaque touchpads integrated in, or peripheral to, notebook or desktop computers). Touch sensor devices are also often used in smaller computing systems (such as touch screens integrated in cellular phones).

Many touch sensor devices utilize an array of sensor electrodes to measure a change in capacitance indicative of the presence of an input object, such as a finger or stylus, proximate the sensor electrodes. Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. Absolute capacitance sensing methods are very effective in detecting the presence of a single input object, even when spaced far from the surface of the touch sensor device.

Other capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of a resulting signal. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit transmitter signals and receive resulting signals. Transcapacitive sensing methods are very effective in detecting the presence of a multiple input objects in a sensing region and input objects that are in motion. However, transcapacitive sensing methods that use routing traces disposed under the sensor electrodes are susceptible to high background capacitive coupling between the traces and the sensor electrodes utilized to drive the modulated signal utilized for generating the electric field between the sensor electrodes. High background capacitance undesirably decreases the signal to noise ratio, making accurate touch sensing more difficult.

Thus, there is a need for an improved touch sensor device.

SUMMARY

Disclosed herein include a processing system, an input device, and methods for transcapacitive sensing. In one example, a processing system is provided that includes a transmitter module, a receiver module, and a timing module. The transmitter module is configured to drive a first signal on a plurality of sensor electrodes arranged in an array comprising M rows and N columns, where M and N are integers greater than one. Routing traces, coupled to the sensor electrodes, are oriented parallel to and below the n columns of sensor electrode. Each sensor electrode is coupled to a unique one of the routing traces. The receiver module is configured to drive a second signal on a plurality of sensor electrodes. The receiver module is configured to receive resulting signals from the plurality of sensor electrodes comprising effects of the first signal driven on the plurality of sensor electrodes. One of the first signal and the second signal is modulated relative to the other of the first signal and the second signal. The timing module is configured to select a first receiver electrode for coupling to the receiver module for transcapacitive sensing, where the first receiver electrode includes one or more first sensor electrodes of the plurality of sensor electrodes arranged in a first column of the N columns. The timing module is also configured to couple at least one of the sensor electrodes disposed in first column and the sensor electrodes disposed in a row of the M rows that includes the first receiver electrode, that are immediately adjacent to the first receiver electrode with a third signal that is not modulated relative to the second signal, wherein the first, second and third signals are driven simultaneously during a first period.

In another example, an input device is provided. The input device includes a plurality of sensor electrodes arranged in an array comprising M rows and N columns, where M and N are integers greater than one, routing traces coupled to the sensor electrodes and arranged in an orientation parallel to an orientation of the N columns, each sensor electrode coupled to a unique one of the routing traces, and a processing system. The processing system is configured to (A) drive a first receiver electrode comprising one or more first sensor electrodes of the plurality of sensor electrodes with a first signal for transcapacitive sensing, the first receiver electrode arranged in a first column of the n columns; (B) drive at least one of the sensor electrodes disposed in the first column and the sensor electrodes disposed in a common row the first receiver electrode that are immediately adjacent to the first receiver electrode selected for transcapacitive sensing with a second signal that is modulated relative to a first signal, the first and second signals simultaneously driven during a first period; and (C) determine a presence of an object based on resulting signals obtained with the first sensor electrode.

In another example, a method is provided. The method includes (A) driving a first receiver electrode comprising one or more first sensor electrodes of a plurality of sensor electrodes with a first signal for transcapacitive sensing during a first time period, the plurality of sensor electrodes arranged in an array comprising M rows and N columns, where M and N are integers greater than one, the plurality of sensor electrodes having routing traces coupled to the sensor electrodes and arranged in an orientation parallel to an orientation of the N columns, the first receiver electrode arranged in a first column of the N columns; (B) driving at least one of the sensor electrodes disposed in the first column and the sensor electrodes disposed in a common row the first receiver electrode, that are immediately adjacent to the first receiver electrode selected for transcapacitive sensing during the first time period with a second signal that is modulated relative to the first signal; and (C) determining a presence of an object based on resulting signals obtained with the first receiver electrode, the resulting signals including effects of the second signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a simplified block diagram of one example of a processing system coupled to sensor electrodes of a portion of the array of sensor elements of FIG. 1.

FIG. 4 are simplified signal diagrams corresponding to signals that may be driven on the sensor electrodes by the processing system illustrated in FIG. 3.

FIG. 5 is a simplified block diagram of another example of a processing system coupled to sensor electrodes of a portion of the array of sensor elements of FIG. 1.

FIG. 6 are simplified signal diagrams corresponding to signals that may be driven on the sensor electrodes by the processing system illustrated in FIG. 5.

FIGS. 7A-E illustrate signal maps of signals applied to a simplified exemplary array of sensor elements during different time periods while the array is scanned to perform transcapacitive sensing.

FIGS. 9A-E illustrate signal maps of signals applied to a simplified exemplary array of sensor elements during different time periods while the array is scanned to perform transcapacitive sensing.

Figure 1:
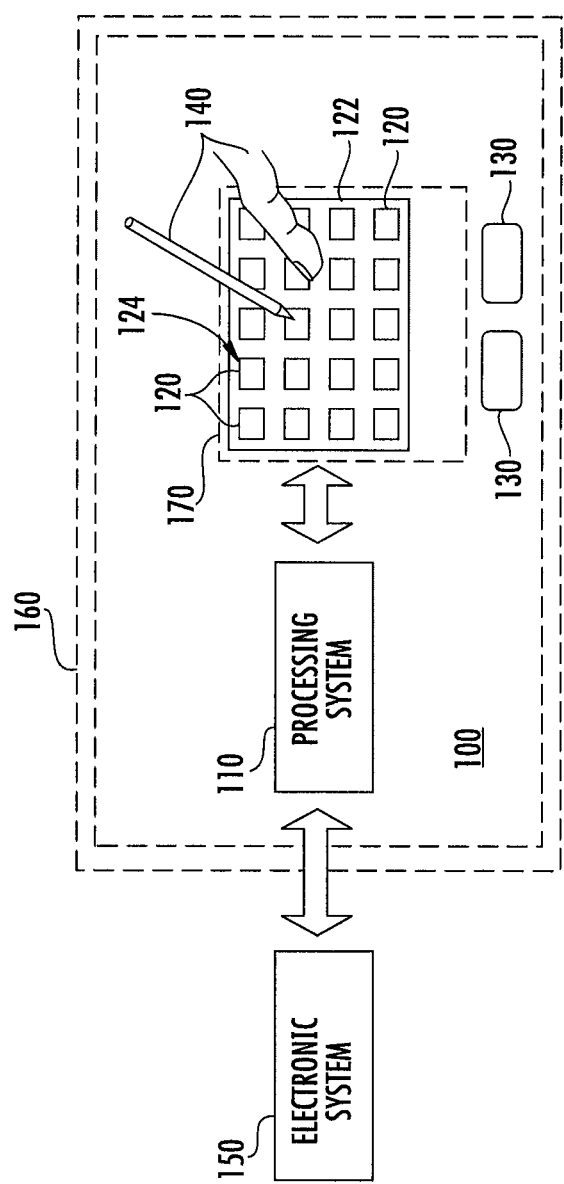
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously reduce capacitive coupling between sensor electrodes arranged in a column of sensor electrodes and routing traces running below the column of sensor electrodes by isolating a receiver electrode selected from the sensor electrodes in the column from the other sensor electrodes in the column by applying a signal that is not modulated relative to the receiver electrode on sensor electrodes that are immediately adjacent the receiver electrode and not being utilized as a transmitter electrode. In this manner, the contribution of background capacitance between other sensor electrodes within the column that are not being utilized for transcapacitive sensing and routing traces below the column is significantly reduced. The reduction in background capacitance advantageously results in a resulting signal having a higher signal to noise ratio, thus enabling more robust and precise determination of the location of objects relative to the sensor electrodes. This technique is particularly useful in touch sensors (as knows as input devices) that have arrays of sensor electrodes having routing traces that run parallel to and below columns of sensor electrodes within the array when performing transcapacitive sensing.

FIG. 1 is a schematic block diagram of an input device 100 in accordance with embodiments of the present technology. In one embodiment, input device 100 comprises a display device 160 comprising an integrated sensing device. Although the illustrated embodiments of the present disclosure are shown integrated with a display device 160, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises an array of sensing elements 124 for detecting user input. The array of sensing elements 124 is comprised of a plurality of sensor electrodes 120.

Some implementations are configured to provide images that span one, two, three, or higher dimensional spaces. Some implementations are configured to provide projections of input along particular axes or planes.

In some capacitive implementations of the input device 100, voltage or current is applied to the sensor electrodes 120 to create an electric field. Nearby input objects cause changes in the electric field, and produce detectable changes in capacitive coupling that may be detected as changes in voltage, current, or the like.

Some capacitive implementations utilize regular or irregular patterns of the sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive. In some embodiments, the receiver sensor electrodes may be modulated relative to the transmitter electrodes to produce resulting signal that comprise effect(s) corresponding to changes in the capacitive coupling between the transmitter and receiver electrodes. The resulting signal are indicate of a presence (or lack thereof) of an input object in the sensing region.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near the array of sensing elements 124 of the input device 100. In other embodiments, components of processing system 110 are physically separate with one or more components close to the array of sensing elements 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate the array of sensing elements 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the array of sensing elements 124 of the input device 100 to produce electrical signals (i.e., resulting signals) indicative of input (or lack of input) in the sensing region 170. The processing system 110 may perform any appropriate amount of processing on the electrical signals in producing the information provided to the electronic system. For example, the processing system 110 may digitize analog electrical signals obtained from the array of sensing elements 124. As another example, the processing system 110 may perform filtering, demodulation or other signal conditioning. In various embodiments, the processing system 110 generates a capacitive image directly from the resulting signals received with sensor electrodes 120 of the array of sensing elements 124. In other embodiments, processing system 110 spatially filters (e.g., taking a difference, weighted sum of neighboring elements) the resulting signals received with sensor electrodes 120 of the array of sensing elements 124 to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate and/or Vcom voltages). Shared components may include display electrodes, substrates, connectors and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
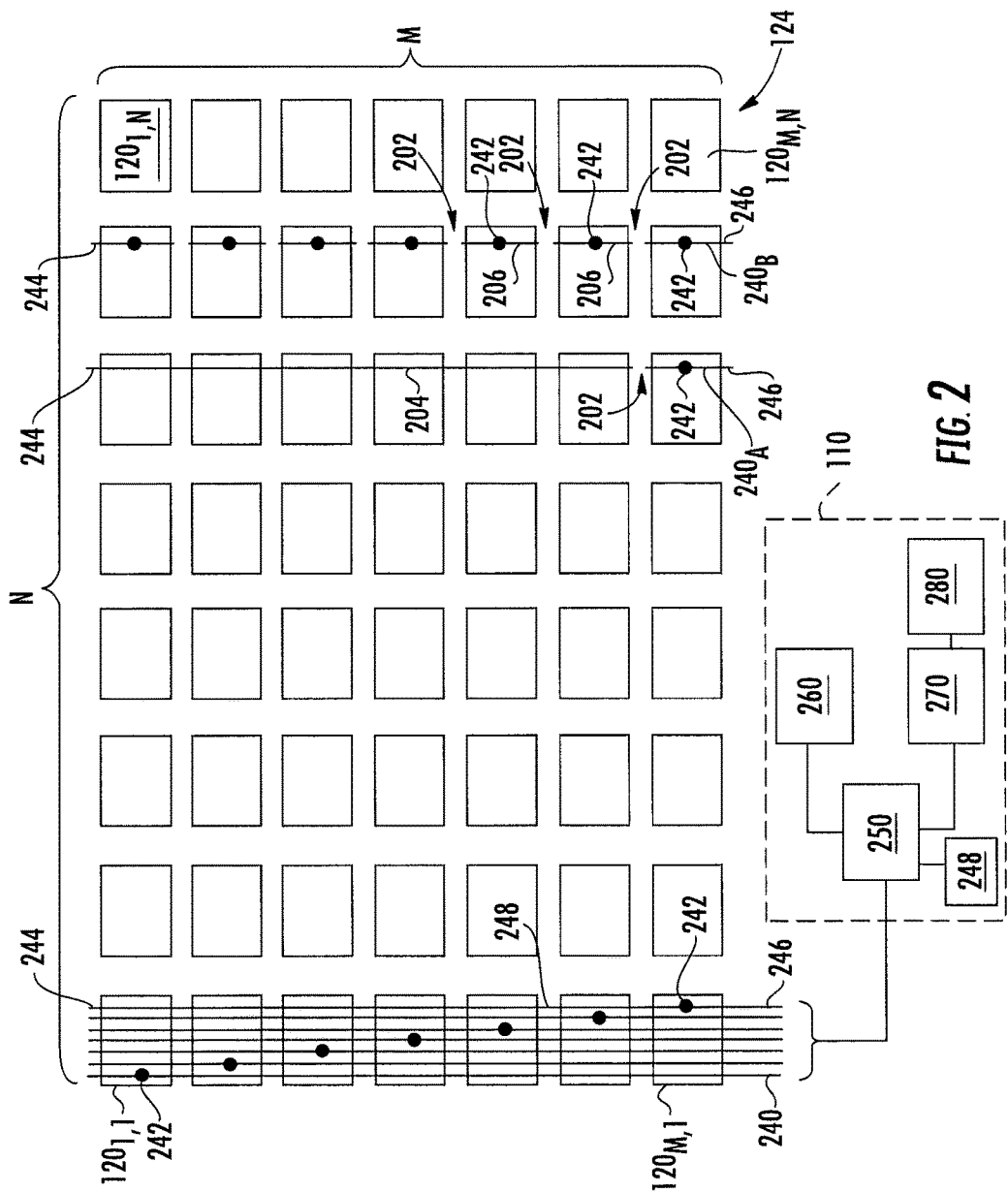
FIG. 2 illustrates a simplified exemplary array of sensor elements that may be used in the input device of FIG. 1 illustrating routing traces coupled to sensor electrodes comprising the array by vias.

FIG. 2 shows an exemplary array of sensing elements 124 configured to sense in the sensing region 170 associated with the sensor electrodes 120, according to some embodiments. For clarity of illustration and description, FIG. 2 shows the sensor electrodes 120 of the array of sensing elements 124 in a pattern of simple rectangles coupled by routing traces 200 to the processing system 110, and does not show various other components. It is contemplated that the individual sensor electrodes 120 may have other shapes. In the example depicted in FIG. 2, the exemplary array of sensing elements 124 comprises Cartesian array (i.e., grid) of sensor electrodes $120_{N,M}$ (referred collectively as sensor electrodes 120) arranged in N columns and M rows, wherein N and M are integers greater than two. It is contemplated that the array of sensing elements 124 may comprises a plurality of sensor electrodes 120 having other configurations, such as polar arrays, repeating patters, non-repeating patterns, or other suitable arrangement. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 are coupled to the processing system 110 and utilized to determine the presence (or lack thereof) of an input object 140 in the sensing region 170.

In a first mode of operation, the arrangement of sensor electrodes 120 may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In a second mode of operation, the sensor electrodes 120 may be utilized to detect the presence of an input object via transcapacitive sensing techniques when a transmitter signal is driven onto one or more selected sensor electrodes 120. That is, processing system 110 is configured drive the selected sensor electrodes 120 with a transmitter signal and receive resulting signals with other sensor electrodes 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to operate switch between any two or more of the modes described above.

The areas of localized capacitive sensing of capacitive couplings may be termed "capacitive pixels." Capacitive pixels may be formed between an individual sensor electrode 120 and reference voltage in the first mode of operation, between individual transmitting and receiving sensor electrodes 120 in the second mode of operation, and between groups of sensor electrodes 120 used as transmitter and receiver electrodes. The capacitive coupling changes with the proximity and motion of input objects 140 in the sensing region 170 associated with the array of sensing elements 124, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit a transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes are received with using a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode with a transmitter or other signal and/or voltage potential. In one embodiment, the switching element may be configured to couple more than one receiver electrode to a common receiver at the same time.

In other embodiments, "scanning" sensor electrodes 120 to determine these capacitive coupling comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment each of the sensor electrodes 120 are simultaneously driven and received with, obtaining an absolute capacitive measurement simultaneously from each of the sensor electrodes 120. In various embodiments, processing system 110 may configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least portion of sensor electrodes 120 being actively utilized for transcapacitive sensing while guarding with at least some of the other sensor electrodes 120.

A set of measurements from the capacitive pixels scanned across the array of sensing elements 124 form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a course capacitive image that may not be usable to discern precise positional information. However, a course capacitive image may be used to sense presence of an input object. In one embodiment, the course capacitive image may be used to move processing system 110 or the input device 100 out of a doze or low power mode. In one embodiment, the course capacitive image may be used to move a capacitive sensor integrated circuit out of a doze mode or low power mode. In another embodiment, the course capacitive image may be used to move a host integrated circuit out of a doze mode or low power mode. The course capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes and their routing traces, where one sensor electrode is driven with a modulated signal and the other is held stationary relative to system ground or from stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the Active Matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 comprise one or more common electrodes, various other display electrodes as describe above may also be used in conjunction with the common electrode or as an alternative to the common electrodes. In various embodiments, the sensor electrodes 120 comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

As discussed above, the sensor electrodes 120 of the array of sensing elements 124 may be formed as discrete geometric forms, polygons, bars, pads, lines or other shape, which are ohmically isolated from one another. In various embodiments, ohmically isolated comprises passively isolated, where active switches may be configured to couple different sensor electrodes to the same signal during a period of time. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials, or the combination of the two. In embodiments wherein the sensor electrodes 120 are utilized with a display device 160, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, molybdenum and conductive carbon materials, among others and various sensor electrodes may be formed of a deposited stack of different conductive materials. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed from a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, in various embodiments, the sensor electrodes 120 may comprise a center to center pitch in the range of about 4 to about 5 mm; however, in other embodiments, the pitch may be less than about 4 mm or greater than about 5 mm. The sensor electrodes 120 may be fabricated in a common plane.

Each sensor electrode 120 within the array of sensing elements 124 has a unique conductive routing trace 240 coupled thereto by one or more vias 242. The routing traces 240 couple the sensor electrodes 120 to the processing system 110.

In the embodiment depicted in FIG. 2, each the conductive routing trace 240 includes a first end 246 and a terminal end 244. The first end 246 of the conductive routing trace 240 generally extends out from under a first side of the array of sensing elements 124 and is coupled to the processing system 110. The terminal end 244 is disposed opposite the first end 246 and extends at least to, and in one example slightly beyond, the last sensor electrode 120 in the column disposed on a second side of the array of sensing elements 124. The first side and second side are on opposite sides of the array of sensing elements 124. The terminal end 244 is not coupled to other electrical components or electrodes, or stated differently, the terminal end 244 is dead ended.

The conductive routing traces 240 are formed in a plane disposed below the sensor electrodes 120 relative the input surface (e.g. the touch surface) of the input device 100. The conductive routing traces 240 may be formed on a metal layer disposed such that the sensor electrodes 120 are between the metal layer and the input surface of the input device 100 that interacts with the input object 140. In one embodiment the metal layer in which the routing traces 240 are formed may also include source driver lines and/or gate lines (not shown) for the display device 160. The conductive routing traces 240 and vias 242 may be obscured from a user by a black mask layer disposed between the traces 240 and vias 242 and the user of the display device 160. At least one of the conductive routing traces 240 may comprise one or more routing traces (conductors) in the source driver metal layer. In one or more embodiments such a layer may be referred to as metal interconnect layer two. Further, conductive routing traces 240 may be disposed on a metal layer between source driver lines. Alternately, at least one of the conductive routing traces 240 may comprise one or more conductors in the gate driver metal layer or gate driver lines not configured for display updating. Further, conductive routing traces 240 may be disposed on a metal layer between gate driver lines. In another embodiment, at least one of the conductive routing traces 240 may comprise one or more conductors in the Vcom jumper metal layer or Vcom lines not otherwise configured for display updating. Further, conductive routing traces 240 may be disposed on a metal layer between gate electrodes. In other embodiments the metal layer is included in addition to a layer comprising the source driver lines and/or gate lines. A portion of the conductive traces 140 may also be formed laterally outward of the areal bounds of the array of sensing elements 124. In various embodiments, the conductive routing traces 240 may be disposed in a Vcom electrode jumper layer. The Vcom electrode jumper layer may be referred to as metal layer three or a metal interconnect layer three. In one embodiment, conductive traces may be disposed on both a source drive layer and a Vcom electrode jumper layer. In various embodiments, the display device 160 may comprise a "dual gate" or half source driver" configuration, allowing conductive routing traces 240 to be disposed between source drivers on the source driver layer. In one or more embodiments, orthogonal directions of connections between the conductive routing traces 240 they may be place on separate layers with vias between them.

In one other example, each sensor electrode 120 may be coupled by a different conductive routing trace 240 to a unique pin of processing system 110. Processing system 110 may be configured to simultaneously receive with multiple sensor electrodes 120 or receive with each sensor electrode 120 independently. In one embodiment, processing system 110 may be configured to receive with one or more sensor electrodes 120 configured as a receiver electrode using a scanning time multiplexed scheme when one or more sensor electrodes 120 are driven with a transmitter signal such that a first signal driven on the receiver electrode is modulated relative to a second signal driven on at least one adjacent sensor electrode 120.

In some embodiments, one or all of the conductive routing traces, illustratively shown as trace 240A in FIG. 2, may optionally include a break 202 (i.e., an open circuit) between the via 224 and the terminal end 244 of the trace 240A. The break 202 separates a portion of the trace 240A coupled to the processing system 110 from an extension 204 that extends from the break 202 to the terminal end 244 of the trace 240A. The extension 204 is electrically isolated from the portion of the trace 240A coupled to the processing system 110 by the break 202, and may be electrically floating.

The presence of the extension 204 co-linear with the routing trace 240A result in a lower RC load of the paired sensor electrode 120 and conductive routing trace 240A as compared to a conventional arrangement that terminates each routing trace at a sensor electrode. The extensions 204 beneficially reduce background capacitance and improve settling time of the input device 100. Moreover, the reduced capacitance provided by the extensions 204 of the routing traces 240A also result in lower power consumption.

In some embodiments, one or all of the conductive routing traces, illustratively shown as trace 240B in FIG. 2, may optionally include a plurality of breaks 202 located between the via 224 and the terminal end 244 of the trace 240B. The breaks 202 form a plurality of segments 206 that are electrically isolated from the portion of the trace 240B coupled to the processing system 110. In one example, the segments 206 may be electrically floating. In another example and as shown in FIG. 2, each of the segments 206 may be coupled by vias 242 to a unique one of the sensor electrodes 120 residing in the column under which the trace 240B is routed. The last segment 206 ends at the terminal end 244. The segments 206 provide similar benefits as the extensions 204.

As discussed above, multiple vias 242 may be utilized to connect a single routing trace 240 to a unique sensor electrode 120. Multiple vias 242 beneficially provide better spatial uniformity of settling across the area occupied by the sensor electrode 120 during both touch sensing and display updating. Moreover, the use of multiple vias 242 coupled to a single sensor electrode 120 beneficially increases reliability and fabrication yield by increasing the probability that at least one of the vias has a robust connection between the paired electrode and conductive routing trace 240.

Continuing to refer to FIG. 2, the processing system 110 coupled to the sensor electrodes 120 includes a sensor module and optionally, a display module 248. The display module 248 contains circuitry configured to drive display line update signals on the sensor electrodes 120, or other electrodes of the display device 160 for updating the displayed image. The sensor module includes a timing module 250, a transmitter module 260, and a receiver module 270. The sensor module may also include a determination module 280, which may alternatively be located remote from the processing system 110, for example, as part of the electronic system 150. The timing module 250, the transmitter module 260, and the receiver module 270 may be formed in a single integrated circuit chip or two or more integrated circuit chips. One or more of the timing module 250, the transmitter module 260, and the receiver module 270 may additionally be integrated on a single integrated circuit chip with the display module 248.

The timing module 250 includes circuitry configured to select which of the sensor electrodes 120 are coupled to the transmitter module 260 and the receiver module 270 for capacitive sensing during non-display update periods. The circuitry of the timing module 250 also is configured to select which of the sensor electrodes 120 are to be connected with a guard signal or in a high impendence condition (i.e., electrically floating) during non-display update periods. The circuitry of the timing module 250 is also utilized to selectively connect the sensor electrodes 120 to the display module during display update periods. The circuitry of the timing module 250 includes multiplexors or other switching circuitry for selectively coupling the sensor electrodes 120 to various modules based on the mode of capacitive sensing during non-display update periods and which sensor electrodes 120 are being scanned in the sensing sequence, or if display updating is occurring during a display update period.

The transmitter module 260 includes circuitry configured to drive a transmitter signal to the sensor electrodes 120 selected to function as transmitter electrodes during capacitive sensing. In one embodiment, the circuitry of the transmitter module 260 is configured to drive a modulated signal on the sensor electrodes 120. In another embodiment, the one embodiment, the circuitry of the transmitter module 260 is configured to drive a non-modulated signal on the sensor electrodes 120, for example, when the sensor electrodes 120 configured as receiver electrodes are modulated.

The transmitter module 260 includes circuitry configured to drive at least one of the sensor electrodes 120 for capacitive sensing during periods in which input sensing is desired. In one embodiment, the sensor module is configured to drive a modulated signal onto the at least one sensor electrode to detect changes in absolute capacitance between the at least one sensor electrode and an input object. In another embodiment, the sensor module is configured to drive a transmitter signal onto the at least one sensor electrode to detect changes in a transcapacitance between the at least one sensor electrode and another sensor electrode. The transmitter signal may be modulated when the receiver module is held at a constant voltage, or the transmitter signal may be constant when the receiver module is modulated.

The modulated signals are generally varying voltage signals comprising a plurality of voltage transitions over a period of time allocated for input sensing. In various embodiments, the sensor electrodes 120 may be driven differently in different modes of operation. In one embodiment, the sensor electrodes 120 may be driven with signals (modulated signals, transmitter signals and/or guard signals) that may differ in any one of phase, amplitude and/or shape. In various embodiments, three modulated signal and transmitter signal are similar in at least one shape, frequency, amplitude and/or phase. In other embodiments, the modulated signal and the transmitter signals are different in frequency, shape, phase, amplitude and phase. The timing module 250 may be selectively coupled one or more of the sensor electrodes 120. For example, the timing module 250 may couple selected portions of the sensor electrodes 120 to the receiver and/or transmitter modules 260, 270, and operate in either an absolute or transcapacitive sensing mode. The processing system 110 is also configured to operate one or more of the sensor electrodes 120 as a guard electrode. In one embodiment, processing system 110 is configured to operate the sensor electrodes 120 as a guard electrode that may shield other sensor electrodes 120 from the electrical effects of nearby conductors and guard the sensor electrodes 120, at least partially reducing the parasitic capacitance between the traces 240 and the sensor electrodes 120 being operated for transmitting or receiving. In one embodiment, a guard signal is driven onto the sensor electrodes 120 operating as a guard electrode that is not being utilized for transmitting or receiving. In some implementations, the guard signal may be a ground signal, such as the system ground or other ground, or any other constant voltage (i.e., non-modulated) signal when the transmitter signal is modulated. In other implementations, the guard signal may be a modulated signal substantially identical to the transmitter signal when the sensor electrodes 120 utilized for receiving are modulated. In another implementation, the guard signal may be a modulated signal substantially identical to an inverse of the transmitter signal when the sensor electrodes 120 utilized for receiving are modulated. In yet other implementations, the sensor electrodes 120 operating as guard electrodes are placed in a high impedance state (i.e., floating) by the timing module 250.

One of the transmitter module 260 or timing module 250 may comprise one or more of a frame buffer (full or partial), host data receiver, gate control, etc. A power management integrated circuit (PMIC) may be coupled to at least one of the transmitter module 260 or timing module 250 and may configured to provide (e.g., generate from a another supply voltage by inductive or capacitive boost circuits, etc.) a high gate voltage, low gate voltage, Vcom voltage, display voltage supply modulation, etc.

The receiver module 270 is includes comprise one or more analog front ends (AFE) and, optionally, one or more digital-to-analog converters (DAC). An input of the AFE receives the resulting signals, while the output of the AFE is coupled to the DAC. The DAC provides a digital signal (i.e., sensing data) representative of the resulting signals to the determination module 280.

The determination module 280 is configured to process the digital signal representative of the resulting signals received from the receiver module 270 to determine positional information. The determination module 280 may be configured to communicate raw sensing data, partially processed sensing data or positional information to the timing module 250, or the determination module 280 may directly communicate this information to the host, such as the electronic system 150. In other embodiments, the determination module 280 may be configured to process the sensing data received from the source driver integrated circuits to determine positional information for one or more input objects.

In one example, the determination module 280 receives sensing data from the receiver module 270 after each time period comprising a discrete portion of the scan. The determination module 280 sums the sensing data over the entire scan to generate a capacitive image. The capacitive image is compared to a baseline image to determine the presence of (or lack of) an input object in the sensing region, as further discussed.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods. In various embodiments, non-display update periods (i.e., periods when no display line updates are occurring) may occur between display line update periods for two display lines of a display frame and may be at least as long in time as the display update period. In such embodiment, the non-display update period may be referred to as a long horizontal blanking period, long h-blanking period or a distributed blanking period, where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between timing module 250 and display module to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g. near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The receiver module 270 includes circuitry configured to receive resulting signals with the array of sensing elements 124 comprising effects corresponding to the modulated signals or the transmitter signals during periods in which input sensing is desired. The receiver module 270 provide information to the determination module 280 that is utilized to determine a position of the input object 140 in the sensing region 170 or may provide a signal including information indicative of the resulting signal to another module or processor, for example, a processor of the electronic system 150 (i.e., a host processor), for determining the position of the input object 140 in the sensing region 170.

The display module 248 may be included in or separate from the processing system 110. The display module 248 includes circuitry confirmed to provide display image update information to the display of the display device 160 during non-sensing (e.g., display updating) periods. In one embodiment, the sensor module, and display module 248 may be comprised within a common integrated circuit (i.e., a single IC chip). In another embodiment, two of the modules comprising the sensor module and display module 248 may be comprised in a first integrated circuit and the other one of the three modules comprising the sensor module be formed in a second integrated circuit. In those embodiments comprising multiple integrated circuits, a synchronization mechanism may be coupled between them, configured to synchronize display updating periods, sensing periods, transmitter signals, display update signals and the like.

Processing system 110 may be configured to simultaneously drive transmitter signals onto one or more sensor electrodes 120 within a column, and receive resulting signals with the sensor electrodes 120 at least within the same column and/or sensor electrodes 120 within columns adjacent the transmitting sensor 120 that are also within the same row as the transmitting sensor electrodes 120. In such an embodiment, other non-receiving and non-transmitting sensor electrodes 120 being utilized for transcapacitive sensing within the column of the transmitting sensor electrode 120 may be utilized for guarding. When multiple sensor electrodes 120 are simultaneously driven for transcapacitive sensing, each transmitting sensor electrodes 120 may be driven with a transmitter signal that is based on a different one of a plurality of digital codes. The digital codes may be any code such that they provide mathematical independent results. In one embodiment, the digital codes for the set of transmitters are substantially orthogonal—i.e., exhibit very low cross-correlation, as is known in the art. Note that two codes may be considered substantially orthogonal even when those codes do not exhibit strict, zero cross-correlation. In a particular embodiment, for example, the digital codes are pseudo-random sequence codes. In other embodiments, Walsh codes, Gold codes, or another appropriate quasi-orthogonal or orthogonal codes may be used. Some substantially orthogonal codes may be selected that have near zero sums which reduce the effect of the codes coupling to display elements, one set of such codes are circulant codes where each code vector is a rotation of the other vectors.

Processing system 110 may be configured to scan through the sensor electrodes 120, driving transmitter signals on to one or more selected sensor electrodes 120 one at a time, while receiving with the sensor electrodes 120 that are adjacent to sensor electrodes 120 driven with the transmitter signals. In one embodiment, only those sensor electrodes 120 that are circumscribed by the sensor electrodes 120 which are being driven are utilized to receive the resulting signals for a particular iteration of the scan. In a subsequent iteration of the scan, another sensor electrode 120 is selected for driving transmitter signals and other sensor electrodes 120 that are adjacent to sensor electrodes 120 driven with the transmitter signals are selected for receiving the resulting signals. This process is iteratively performed until a desired portion, such as the entire array of sensing elements 124 are utilized for transcapacitive sensing. Other sensor electrodes 120 not being utilized during a particular portion of the scanning process may be utilized to guard the traces 240 from the signal transmitted from the transmitting sensor electrodes 120 as further described below.

FIG. 3 is a simplified block diagram of one example of a processing system 110 coupled to the sensor electrodes 120 of a portion of the array of sensing elements 124 of FIG. 1. The processing system 110 of FIG. 3 is configured to modulate the transmitter sensor electrodes relative to the receiver sensor electrodes for transcapacitive sensing. The four sensor electrodes 120 shown in FIG. 3 are labeled Tx, Rx, +G, and −G. The +G signal and a −G signal are signals that are not modulated relative to the Rx signal. When the Rx signal is a constant positive voltage, the +G signal has a constant positive voltage, and the −G signal is the inverse of the +G signal such that the −G signal has a constant negative voltage. The sensor electrode 120 labeled Tx is utilized as a transmitter (Tx) electrode and is coupled to the transmitter module 260 through the timing module 250. The transmitter module 260 is coupled to a modulated signal generator 310. The modulated signal generator 310 provides a modulated signal which is driven out on the Tx electrode by transmitter module 260. The timing module 250 selects which of the sensor electrodes 120 will be utilized as the Tx electrode in accordance with a scanning or other sensing sequence. In one embodiment, the signal driven on the Tx electrode by transmitter module 260 may be a square wave, such as illustrated by the Tx voltage plot of FIG. 4. In certain implementations, the sensor electrodes 120 operating as guard electrodes may alternatively be placed in a high impedance state (i.e., floating) by the timing module 250.

The sensor electrode 120 labeled Rx is utilized as a receiver (Rx) electrode and is coupled to the receiver module 270 through the timing module 250. The receiver module 270 includes an analog front end (AFE) 306. A positive input of the AFE 306 is coupled to a non-modulated signal generator 304. The non-modulated signal generator 304 provides a non-modulated signal (i.e., ground, system ground, constant DC, etc.) to the positive input of the AFE 306. The non-modulated signal generator 304 may also be a positive DC voltage rail. The negative input of the AFE 306 is coupled to the Rx electrode through the timing module 250 and receives the resulting signals during transcapacitive sensing that includes effects of the transmitter signals driven on the Tx electrode. The timing module 250 selects which of the sensor electrodes 120 will be utilized as the Rx electrode in accordance with a scanning or other sensing sequence. An output of the AFE 306 is coupled to the determination module 280. In one embodiment, the signal driven on the Rx electrode by receiver module 270 may be a positive DC voltage, such as illustrated by the Rx voltage plot of FIG. 4.

The non-modulated signal generator 304 also provides a non-modulated guard signal that is substantially identical to the signal provided to the Rx electrode to the sensor electrodes 120 identified as +G. The +G electrode is coupled to the non-modulated signal generator 304 through the timing module 250 selects which of the sensor electrodes 120 will be utilized as the +G electrode in accordance with a scanning or other sensing sequence. In one embodiment, the guard signal driven on the +G electrode is substantially the same as the Rx electrode, such as illustrated by the +G signal plot of FIG. 4. In FIG. 4, the +G signal is a non-modulated signal having a positive voltage.

In some embodiments, the timing module 250 may also include a voltage inverter 302. The voltage inverter 302 includes circuitry that generates a negative voltage from a positive input. In the embodiment depicted in FIG. 3, the input of the voltage inverter 302 is coupled to the non-modulated signal generator 304, and thus, receives the +G signal and outputs a −G signal, such as shown in FIG. 4, which is the inverse of the +G signal. The absolute value of the voltage amplitude of the −G signal is substantially the same as the voltage amplitude of the +G signal. The output of the voltage inverter 302 is coupled to the sensor electrode 120 labeled −G in FIG. 3. Alternatively, the −G electrode may be coupled directly to a negative supply rail through the timing module 250 without use of an inverter. The timing module 250 selects which of the sensor electrodes 120 will be utilized as the −G electrode in accordance with a scanning or other sensing sequence to provide the −G signal as a guard signal. In some embodiments, the −G signal is not utilized. As stated above, the timing module 250 can also place one or more of the sensor electrodes 120 in an electrically floating state.

FIG. 5 is a simplified block diagram of another example of a processing system 110 that can be coupled to sensor electrodes 120 of a portion of the array of sensing elements 124 of FIG. 1. The processing system 110 of FIG. 5 is configured to modulate the receiver sensor electrodes relative to the transmitter sensor electrodes for transcapacitive sensing. Similar to as illustrated in FIG. 3, four sensor electrodes 120 shown in FIG. 5 are labeled Tx, Rx, +G, and −G. The +G signal and a −G signal are signals that are not modulated relative to the Rx signal. When the Rx signal is a modulated voltage, the +G signal is substantially the same as the Rx signal, and the −G signal is the inverse of the +G. The sensor electrode 120 labeled Tx is utilized as a transmitter (Tx) electrode and is coupled to the transmitter module 260 through the timing module 250. The transmitter module 260 is coupled to a non-modulated signal generator 304, or alternatively to a positive voltage rail. The non-modulated signal generator 304 provides a non-modulated signal (i.e., ground, system ground, constant DC, etc.) to the Tx electrode through the timing module 250. As stated above, the timing module 250 selects which of the sensor electrodes 120 will be utilized as the Tx electrode in accordance with a scanning or other sensing sequence. In one embodiment, the signal driven on the Tx electrode by transmitter module 260 may be a positive DC voltage, such as illustrated by the Tx voltage plot of FIG. 6.

The sensor electrode 120 labeled Rx is utilized as a receiver (Rx) electrode and is coupled to the receiver module 270 through the timing module 250. As discussed above, the receiver module 270 includes an analog front end (AFE) 306. However, in the embodiment depicted in FIG. 5, a positive input of the AFE 306 is coupled to a modulated signal generator 310. The negative input of the AFE 306 is coupled to the Rx electrode through the timing module 250 and receives the resulting signals during transcapacitive sensing. The timing module 250 selects which of the sensor electrodes 120 will be utilized as the Rx electrode in accordance with a scanning or other sensing sequence. The modulated signal generator 310 provides a modulated signal to the AFE 306, which in turn causes the AFE 306 to modulate the Rx electrode. In one embodiment, the signal driven on the Rx electrode by transmitter module 260 may be a square wave, such as illustrated by the Rx voltage plot of FIG. 6. Since the AFE 306 is modulated by the modulated signal generator 310, the Rx voltage is modulated relative to the Tx voltage, thereby enabling transcapacitive sensing may be performed utilizing the Tx and Rx electrodes. An output of the AFE 306 is coupled to the determination module 280, which analyses the sensing data to determine positional information of input objects within the sensing region.

The modulated signal generator 310 also provides a modulated signal that is substantially identical to the signal provided to the Rx electrode to the sensor electrodes 120 identified as +G through the timing module 250. The +G electrode is coupled to the modulated signal generator 310 through the timing module 250 selects which of the sensor electrodes 120 will be utilized as the +G electrode in accordance with a scanning or other sensing sequence. In one embodiment, the signal driven on the +G electrode is substantially the same as the Rx electrode, such as illustrated by the +G signal plot of FIG. 6.

In some embodiments, the timing module 250 may also include a voltage inverter 302. As discussed above, the voltage inverter 302 includes circuitry that generates a negative voltage from a positive input. In the embodiment depicted in FIG. 5, the input of the voltage inverter 302 is coupled to the modulated signal generator 104, and thus, receives the +G signal and outputs a −G signal, such as shown in FIG. 6, which is the inverse of the +G signal. The absolute value of the voltage amplitude of the −G signal is substantially the same as the voltage amplitude of the +G signal. The output of the voltage inverter 302 is coupled to the sensor electrode 120 labeled −G in FIG. 5. The timing module 250 selects which of the sensor electrodes 120 will be utilized as the −G electrode in accordance with a scanning or other sensing sequence. As discussed above, the −G signal is not utilized in some embodiments. In certain implementations, the sensor electrodes 120 operating as guard electrodes may alternatively be placed in a high impedance state (i.e., floating) by the timing module 250.

FIGS. 7A-E illustrate signal maps of signals applied to a simplified exemplary array of sensing elements 124 during different time periods while the array is scanned to perform transcapacitive sensing. The transcapacitive sensing may be performed with either of the processing systems 110 illustrated in FIGS. 3 and 5, or other suitable processing system. FIG. 8 is a block diagram of an exemplary method 800 for transcapacitive sensing corresponding at least to the signal maps illustrated in FIGS. 7A-E, while utilizing the processing system 110 illustrated in FIG. 5. The processing system 110 illustrated in FIG. 3 may alternatively be utilized with the method 800, however, the designation of which sensor electrodes are modulated during the method 800 is reversed when using the processing system 110 of FIG. 3.

Referring to FIGS. 7A-E and FIG. 8, the method 800 begins at operation 802 by driving a first receiver electrode (Rx electrode) 700 comprising one or more sensor electrodes 120 of a plurality of sensor electrodes 120 with a first signal (Rx) for transcapacitive sensing during a first time period. Each time period of the method 800 refers to a single portion of a scanning sequence in which the entire array of sensing elements 124 are scanned to generate a single capacitive image of the array. The first receiver electrode 700 that receives the first signal is also identified with the label AFE in FIG. 7A. Other sensor electrodes 120 in the array may also be simultaneously driven with the Rx signal, and thus, are also labeled AFE in FIG. 7A.

As discussed above, plurality of sensor electrodes 120 are arranged in an array of sensing elements 124 comprising M rows and N columns, where M and N are integers greater than one. The plurality of sensor electrodes 120 have routing traces 240 coupled to the sensor electrodes 120 and arranged in an orientation parallel to an orientation of the N columns (as illustrated in FIG. 2). The first receiver electrode 700 is arranged in a first column 702 of the N columns. Although, the description of the method 800 follows events relative to the first receiver electrode 700 in the first column 702, the method 800 is applicable to any of the AFE electrodes disposed in other columns of the array of sensing elements 124.

At operation 804, at least one sensor electrode 120 disposed in the first column 702 and the sensor electrodes 120 disposed in a common row the first receiver electrode 700, which are immediately adjacent to the first receiver electrode 700 selected for transcapacitive sensing during the first time period are driven with a second signal (Tx) that is modulated relative to the first signal. Stated differently, (A) at least one sensor electrode 120 that is disposed in the first column 702 and immediately adjacent to the first receiver electrode 700; and (B) sensor electrodes 120 that are disposed in a common row the first receiver electrode 700; are driven with a second signal (Tx) that is modulated relative to the first signal. The Tx electrodes that receive the second signal are identified by the label DC in FIG. 7A.

Figure 7A:
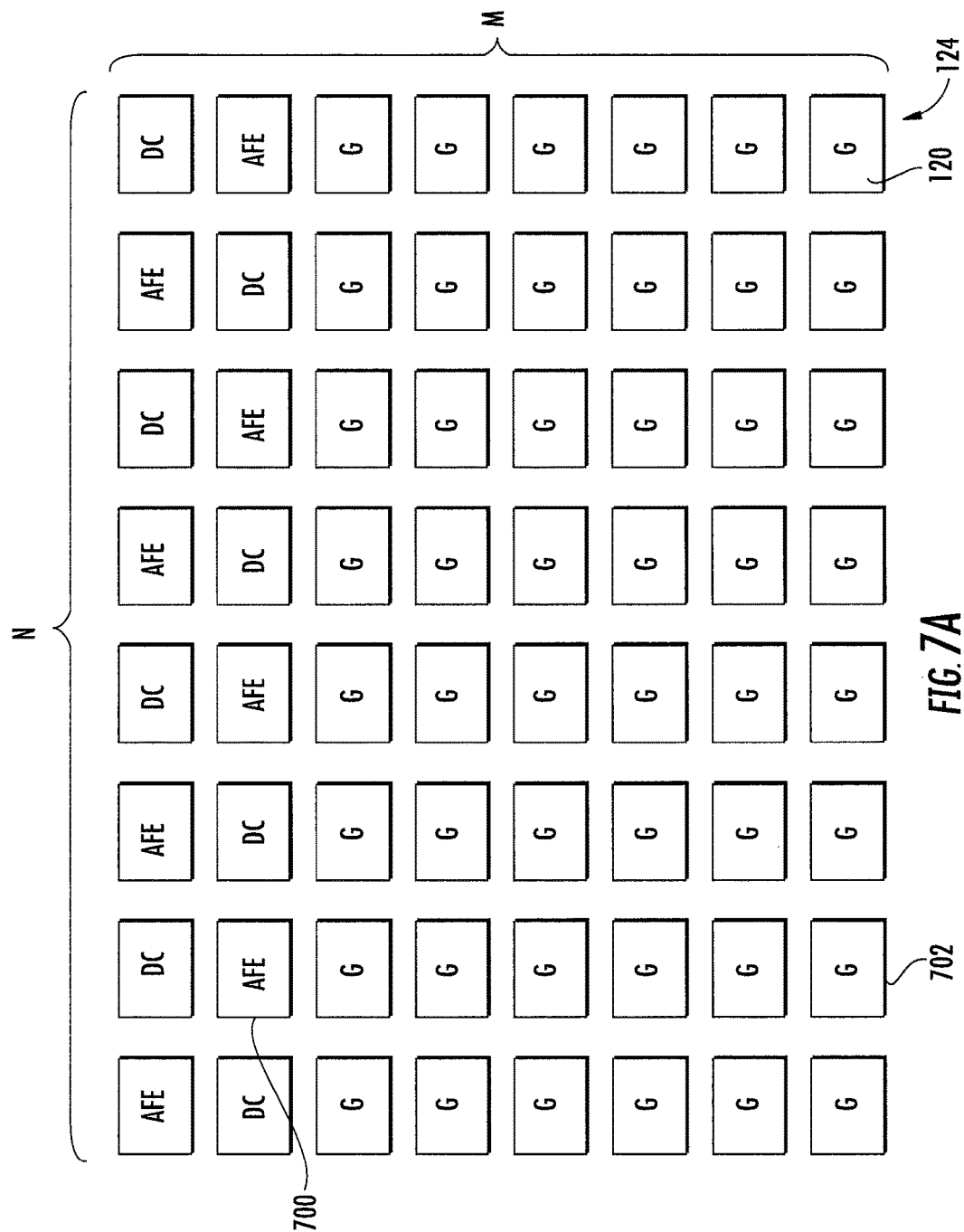
Figure 8:
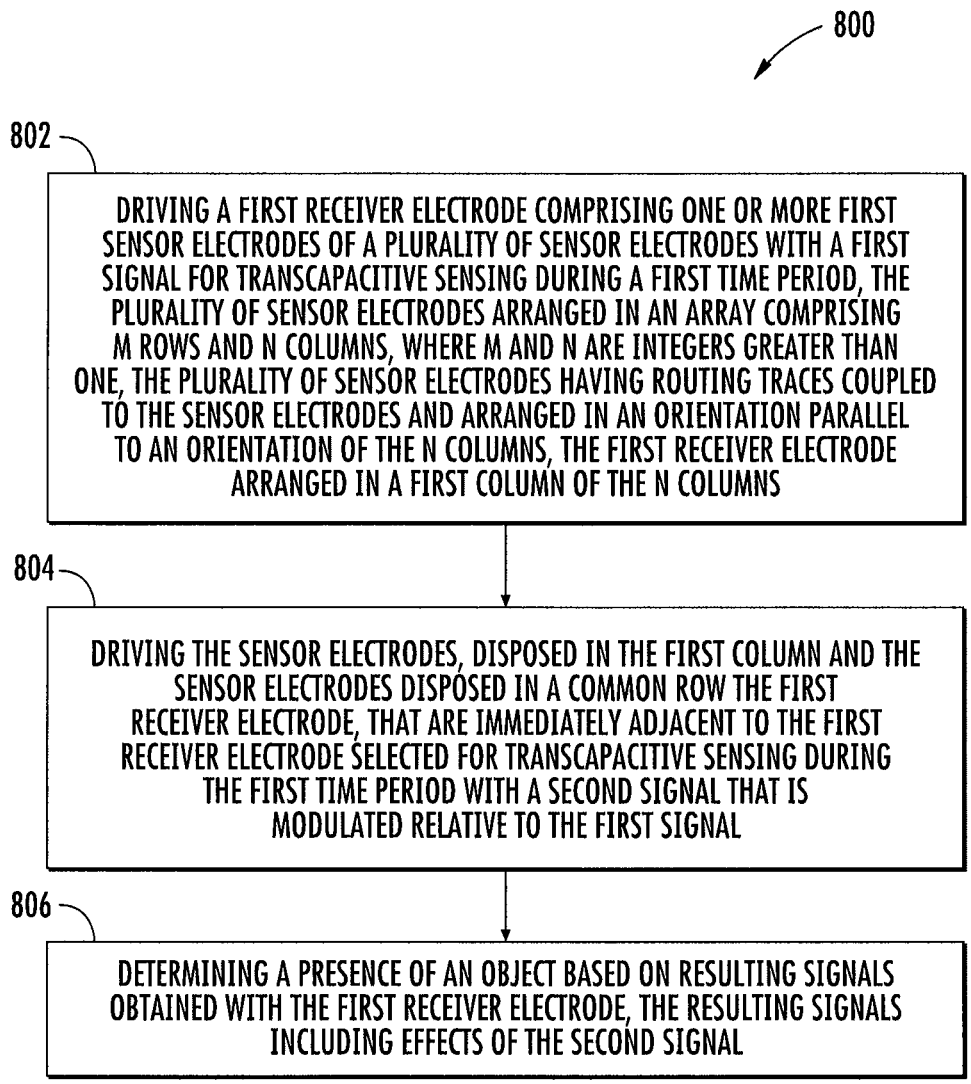
FIG. 8 is a block diagram of an exemplary method for transcapacitive sensing corresponding at least to the signal maps illustrated in FIGS. 7A-E.

As shown in FIG. 7A, the sensor electrodes 120 disposed in the first column 702 that are not driven with the Rx or Tx signal, are driven with a guard signal, such as the +G signal illustrated in FIG. 6. The sensor electrodes that receive the +G signal are identified by the label G in FIG. 7A. Because the +G signals driven on the G electrodes in the first column 702 have a signal substantially identical to the Rx signal driven on the first receiver electrode 700, the routing traces 240 (as shown in FIG. 2) that are routed below and parallel to the first column 702, the +G signals on the G electrodes in the first column 702 substantially do not capacitively couple to the routing trace 240 coupled to the first receiver electrode 700. Therefore, the amount of parasitic capacitance present in the resulting signals is reduced, both during baseline measurements and transcapacitance sensing, thereby improving the signal to noise ratio during sensing.

Alternatively, at least one of the sensor electrodes 120 disposed in the first column 702 that are not driven with the Rx or Tx signal, may be placed in an electrically floating condition. For example, the sensor electrode G disposed in the first column 702 that is immediately adjacent the first receiver electrode 700 may be placed in an electrically floating (i.e., high impedance) condition. Thus, in the description below, any sensor electrode 120 driven with a +G signal that is disposed in the first column 702 immediately adjacent the first receiver electrode 700 may alternatively be placed in a floating condition. Additionally, one or more of the other sensor electrodes G disposed in the first column 702 may optionally be placed in an electrically floating condition.

At operation 806, a presence of an input object is determined based on resulting signals obtained with the first receiver electrode 700 during the first time period. The resulting signals include effects of the second signal, and are provided as sensing data to the determination module 280 from the AFE 306. Since the first Rx signal is modulated relative to the Tx signal, the difference in voltage driven on the Rx and Tx electrodes 120 allows transcapacitive sensing to be performed utilizing the resulting signals provided as an input to the AFE 306 while minimizing parasitic capacitance between electrodes in the first column 702 and the trace 240 coupled to the first receiver electrode 700. Thus, the method 800 yields more accurate transcapacitive sensing results with reduced need for costly noise mitigation techniques.

While transcapacitive sensing during the first time period is being performed in the first column 702, transcapacitive sensing may be performed in the same row as the first receiver electrode 700 and at least one adjacent row. For example, as illustrated in FIG. 7A, AFE electrodes in the same row as the first receiver electrode 700 may be driven with the Rx signal. The AFE electrodes in the same row as the first receiver electrode 700 are separated from each other and from the first receiver electrode 700 by at least one transmitter (DC) electrode. The position of AFE electrodes in the adjacent rows are staggered to maintain allow each AFE electrode to be substantially separated from adjacent AFE electrodes by at least one Tx electrode to provide good positional detection in the direction of the row. In this manner, transcapacitive sensing in the direction of the row may be readily performed during the first period.

After transcapacitive sensing during the first time period is complete, the method 800 repeats utilizing the next row in the scanning sequence. For example, the timing module 250 changes the connections between the sensor electrodes 120 and the receiver and transmitter modules 260, 270 so that the first receiver electrode 700 illustrated the second row of sensor electrodes 120 in FIG. 7A is indexed to the third row of sensor electrodes 120 in FIG. 7B so that transcapacitive sensing may be performed during a second time period. It is contemplated that the row in which the first receiver electrode 700 is designated does not have to be sequential or even adjunct to the position of the first receiver electrode 700 during the first time period.

Figure 7B:
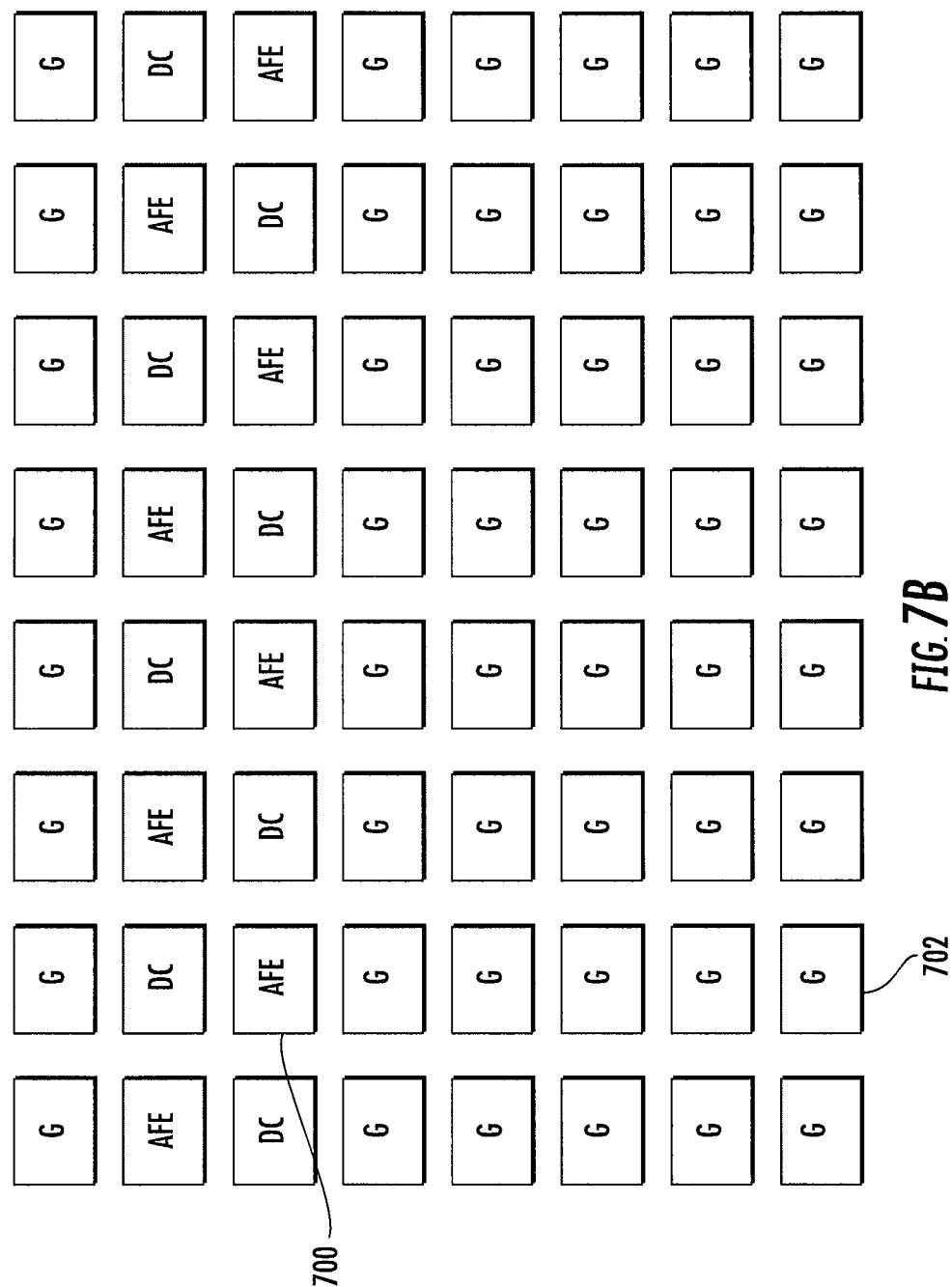

As illustrated in FIG. 7B, the first receiver electrode 700 disposed in the first column 702 is adjacent the Tx electrode (i.e., DC electrode) for capacitive sensing in the second period. The DC/AFE electrode pair disposed in the first column 702 is surrounded in the first column 702 by G electrodes on which the guard signal (+G) is provided, thus shielding the trace 240 coupled to the first receiver electrode 700 that is routed below and parallel to the first column 702.

After transcapacitive sensing during the second time period is complete, the method 800 repeats utilizing the next row in the scanning sequence. For example, the timing module 250 changes the connections between the sensor electrodes 120 and the receiver and transmitter modules 260, 270 so that the first receiver electrode 700 illustrated the third row of sensor electrodes 120 in FIG. 7B is indexed to the fourth row of sensor electrodes 120 in FIG. 7C so that transcapacitive sensing may be performed during a third time period.

Figure 7C:
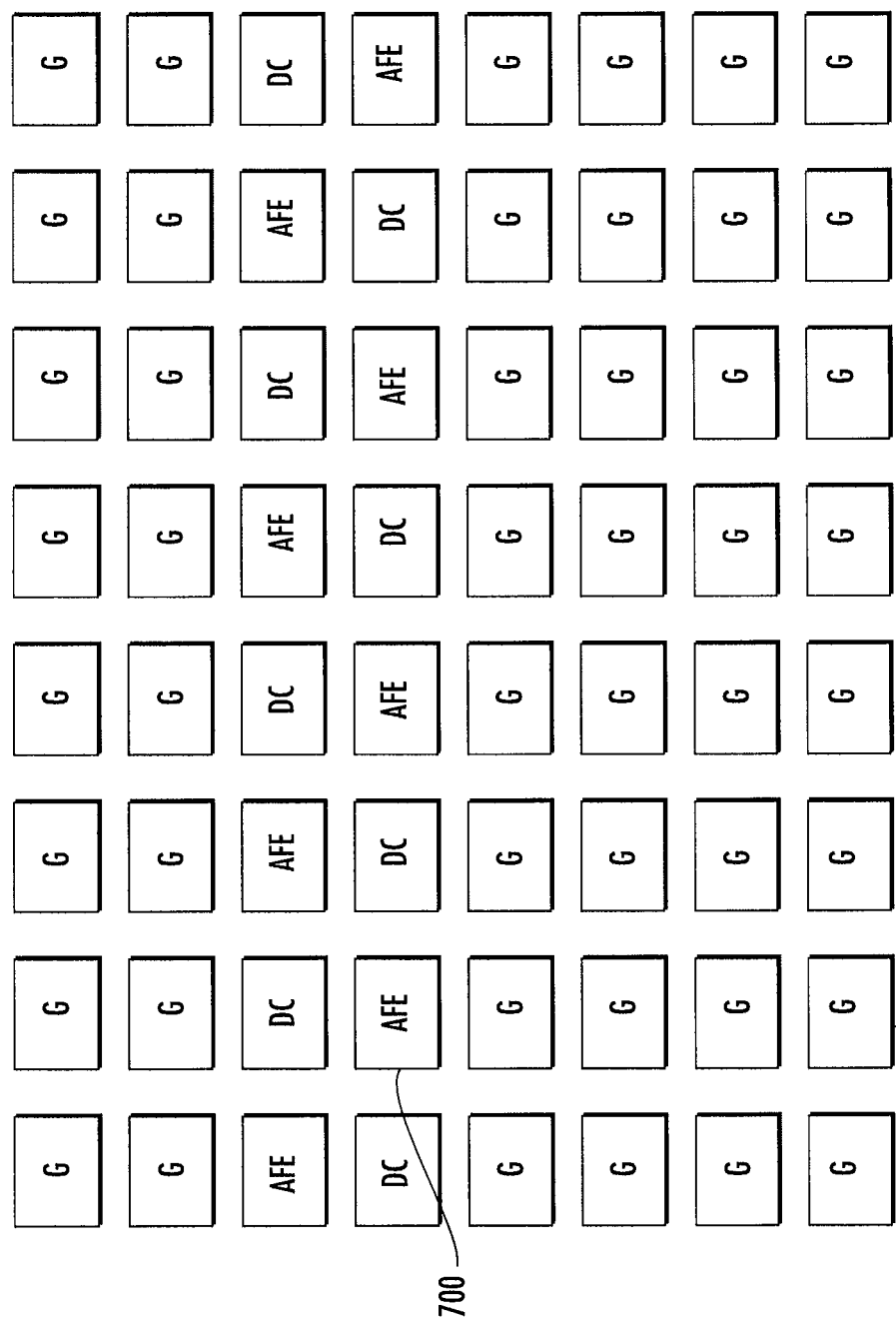

As illustrated in FIG. 7C, the first receiver electrode 700 disposed in the first column 702 is adjacent the Tx electrode (i.e., DC electrode) for capacitive sensing in the second period. The DC/AFE electrode pair disposed in the first column 702 is surrounded in the first column 702 by G electrodes on which the guard signal (+G) is provided, thus shielding the trace 240 coupled to the first receiver electrode 700 that is routed below and parallel to the first column 702.

Figure 7D:
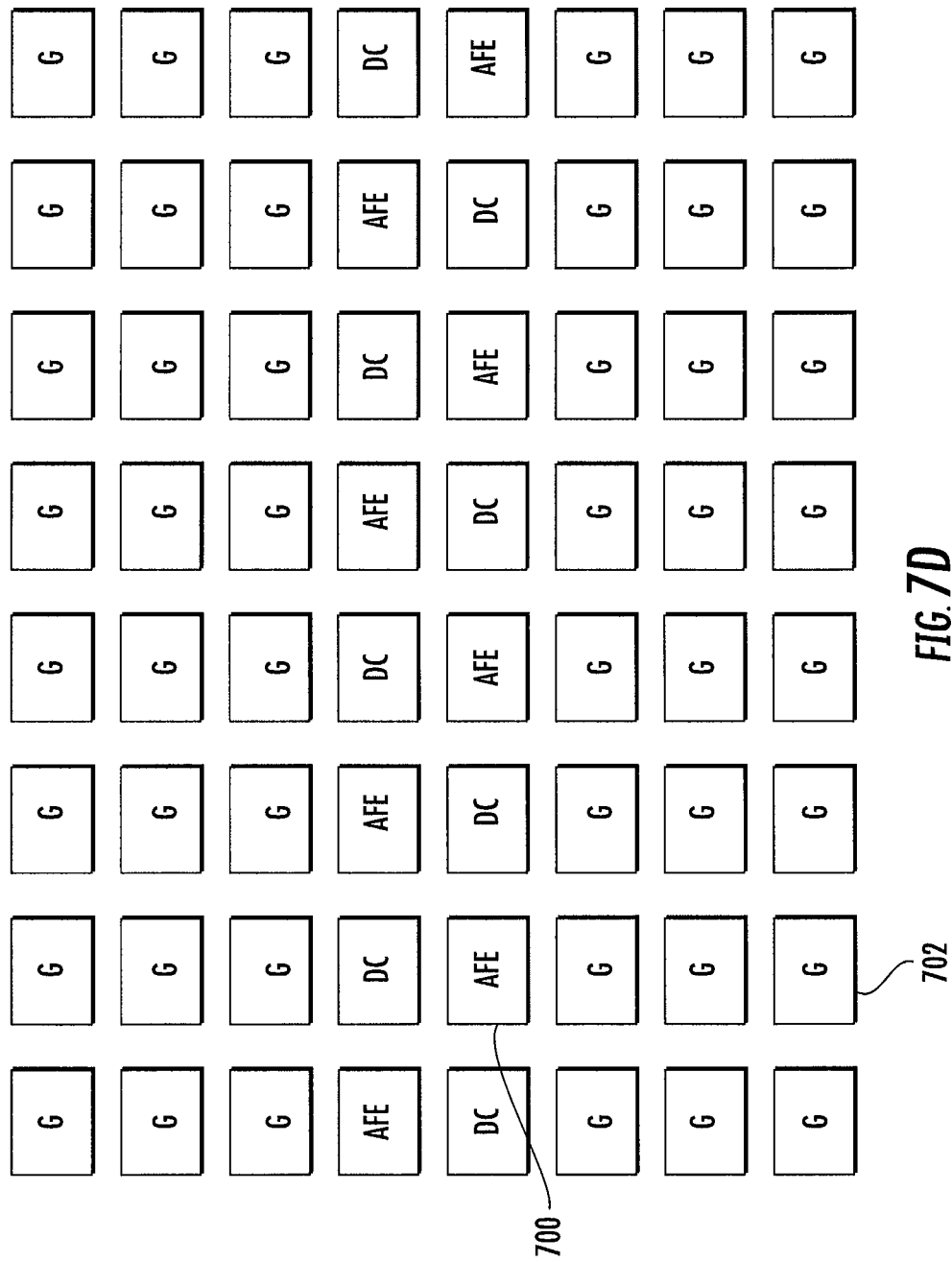

After transcapacitive sensing during the third time period is complete, the method 800 repeats as shown in FIGS. 7D-E and so on until the entire first column 702 is scanned to obtain a capacitive image.

FIGS. 9A-E illustrate signal maps of signals applied to a simplified exemplary array of sensing elements 124 during different time periods while the array is scanned to perform transcapacitive sensing. The transcapacitive sensing may be performed with either of the processing systems 110 illustrated in FIGS. 3 and 5, or other suitable processing system. FIG. 10 is a block diagram of an exemplary method 1000 for transcapacitive sensing corresponding at least to the signal maps illustrated in FIGS. 9A-E. The processing system 110 illustrated in FIG. 3 may alternatively be utilized with the method 1000, however, the designation of which sensor electrodes are modulated during the method 1000 is reversed when using the processing system 110 of FIG. 3.

Referring to both FIGS. 9A-E and FIG. 10, the method 1000 begins at operation 1002 by driving a first receiver electrode (Rx electrode) 700 comprising one or more sensor electrodes 120 of a plurality of sensor electrodes 120 with a first signal (Rx) for transcapacitive sensing during a first time period. Similar to the method 800 discussed above, each time period of the method 1000 refers to a single portion of a scanning sequence in which the entire array of sensing elements 124 are scanned to obtain a capacitive image. The first receiver electrode 700 that receives the first signal is also identified with the label AFE in FIG. 9A. Other sensor electrodes 120 in the array may also be simultaneously driven with the Rx signal, and thus, are also labeled AFE in FIG. 9A.

As discussed above, plurality of sensor electrodes 120 are arranged in an array of sensing elements 124 comprising M rows and N columns, where M and N are integers greater than one. The plurality of sensor electrodes 120 have routing traces 240 coupled to the sensor electrodes 120 and arranged in an orientation parallel to an orientation of the N columns (as illustrated in FIG. 2). The first receiver electrode 700 is arranged in a first column 702 of the N columns. Although, the description of the method 1000 follows events relative to the first receiver electrode 700 in the first column 702, the method 1000 is applicable to any of the AFE electrodes disposed in other columns of the array of sensing elements 124.

At operation 1004, the sensor electrodes 120 disposed in the first column 702 and the sensor electrodes 120 disposed in a common row the first receiver electrode 700, that are immediately adjacent to the first receiver electrode 700 selected for transcapacitive sensing during the first time period, are driven with a second signal (Tx) that is modulated relative to the first signal. The Tx electrodes that receive the second signal are identified by the label DC in FIG. 9A.

Figure 9A:
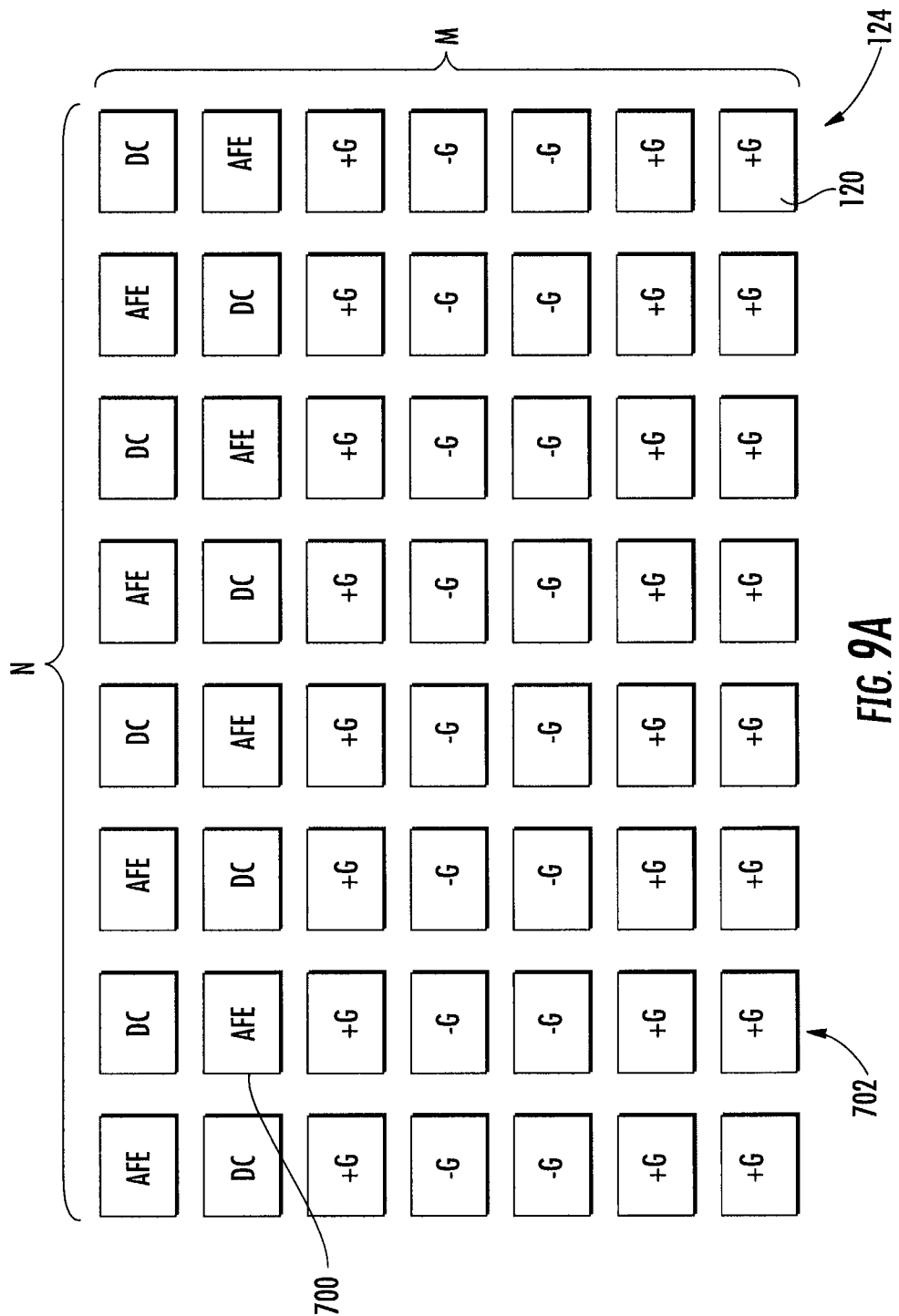
Figure 10:
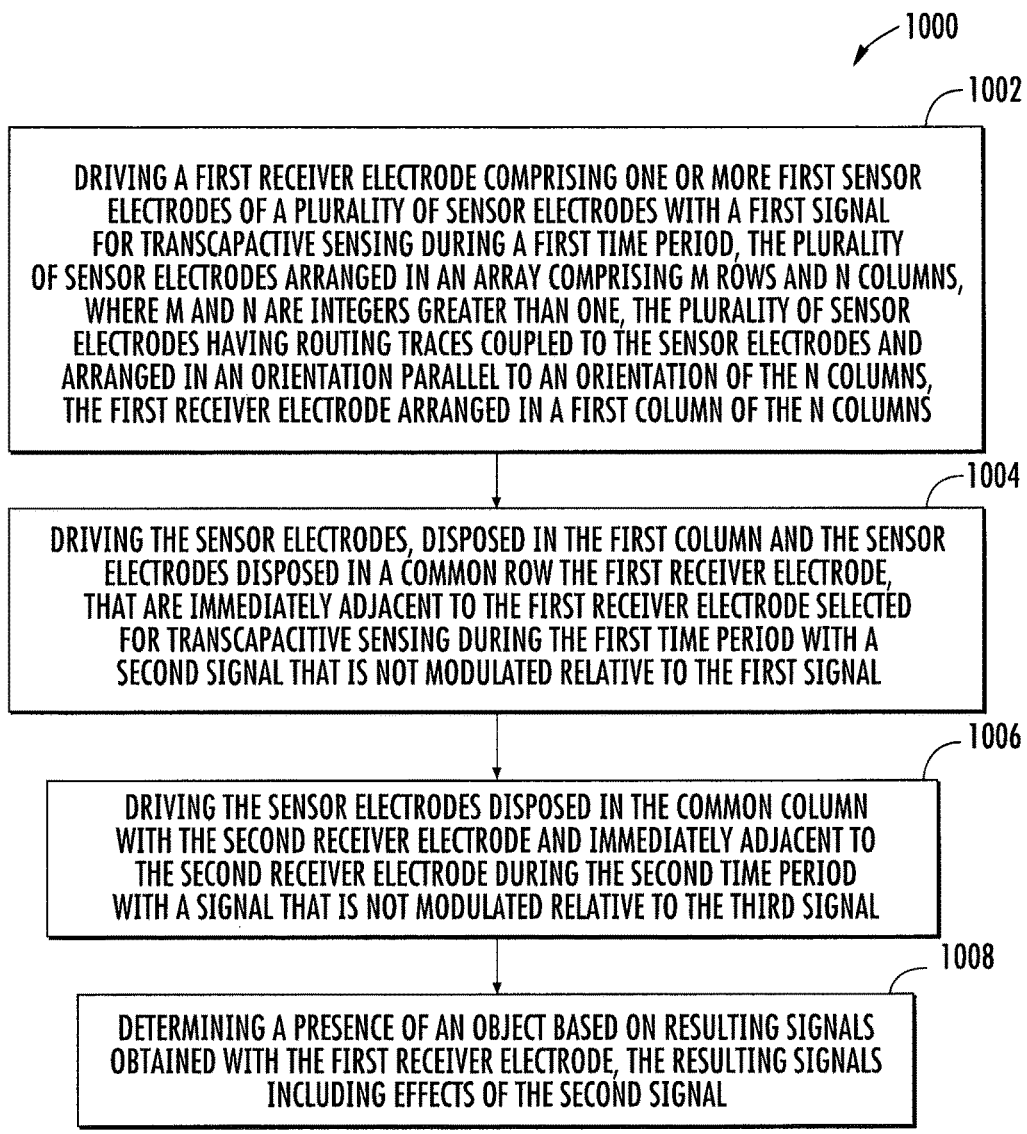
FIG. 10 is a block diagram of an exemplary method for transcapacitive sensing corresponding at least to the signal maps illustrated in FIGS. 9A-E.

As shown in FIG. 9A, the sensor electrodes 120 disposed in the first column 702 that are not driven with the Rx or Tx signal, and are immediately adjacent the AFE and DC electrodes, are driven with a guard signal that is substantially identical to the first signal, such as the +G signal illustrated in FIG. 6. The sensor electrodes 120 that receive the +G signal are identified by the label +G in FIG. 9A. Because the +G signals driven on the +G electrodes in the first column 702 have a signal substantially identical to the Rx signal driven on the first receiver electrode 700, the +G signals on the +G electrodes comprising the first column 702 substantially do not capacitively couple to the routing trace 240 coupled to the first receiver electrode 700 that is routed below and parallel to the first column 702. Therefore, the amount of parasitic capacitance present in the resulting signals is reduced, both during baseline measurements and transcapacitance sensing, thereby advantageously improving the signal to noise ratio.

Alternatively, at least one of the sensor electrodes 120 disposed in the first column 702 that are not driven with the Rx or Tx signal, may be placed in an electrically floating condition. For example, the sensor electrode +G disposed in the first column 702 that is immediately adjacent the first receiver electrode 700 may be placed in an electrically floating (i.e., high impedance) condition.

At operation 1006, at one sensor electrode 120, disposed in the first column 702 and not driven with the first or second signals, is driven with a third signal that has a polarity that is opposite the second signal. The third signal is illustrated in FIG. 6 and may be generated by the inverter 302 to form the −G signal from the +G signal. The −G signal is applied to the sensor electrodes 120 identified as −G in FIG. 9A. The −G electrodes are separated from the AFE electrodes by at least one +G electrode. The −G signal applied to the −G electrodes in the first column 702 balance the charge added to the routing trace 240 coupled to the first receiver electrode 700 by the +G signal applied to the +G electrodes disposed in the first column 702. By applying both +G signal and −G signals in the first column 702, the amount of charge inputted to the AFE 306 while obtaining a baseline is reduced, thereby reducing size and cost requirements of the AFE 306 utilized in the receiver module 270.

Alternatively, at least one of the −G electrodes disposed in the first column 702 may be placed in an electrically floating condition instead of being driven with the −G signal.

At operation 1008, a presence of an input object is determined based on resulting signals obtained with the first receiver electrode 700 during the first time period. The resulting signals include effects of the second signal and are provided as sensing date to the determination module 280 for processing. Since the first Rx signal is modulated relative to the Tx signal, the difference in voltage driven on the Rx and Tx electrodes 120 allows transcapacitive sensing to be performed utilizing the resulting signals provided as an input to the AFE 306 while minimizing parasitic capacitance between electrodes in the first column 702 and the trace 240 coupled to the first receiver electrode 700. Thus, the method 1000 yields more accurate transcapacitive sensing results with reduced need for costly noise mitigation techniques.

Similar to the method 800, while transcapacitive sensing during the first time period is being performed in the first column 702, transcapacitive sensing may be performed in the same row as the first receiver electrode 700 and at least one adjacent row. For example, as illustrated in FIG. 9A, AFE electrodes in the same row as the first receiver electrode 700 may be driven with the Rx signal. The AFE electrodes in the same row as the first receiver electrode 700 are separated from each other and from the first receiver electrode 700 by at least one transmitter (DC) electrode. The position of AFE electrodes in the adjacent rows are staggered to allow each AFE electrode to be substantially separated from adjacent AFE electrodes by at least one Tx electrode, thus enabling good positional detection of input objects in the direction of the row. In this manner, transcapacitive sensing in the direction of the row may be readily performed.

Similar to the method 800, after transcapacitive sensing during the first time period is complete, the method 1000 repeats utilizing the next row in the scanning sequence. For example, the timing module 250 changes the connections between the sensor electrodes 120 and the receiver and transmitter modules 260, 270 so that the first receiver electrode 700 illustrated the second row of sensor electrodes 120 in FIG. 9A is indexed to the third row of sensor electrodes 120 in FIG. 9B so that transcapacitive sensing may be performed during a second time period. It is contemplated that the row in which the first receiver electrode 700 is designated does not have to be sequential or even adjunct to the position of the first receiver electrode 700 during the first time period.

Figure 9B:
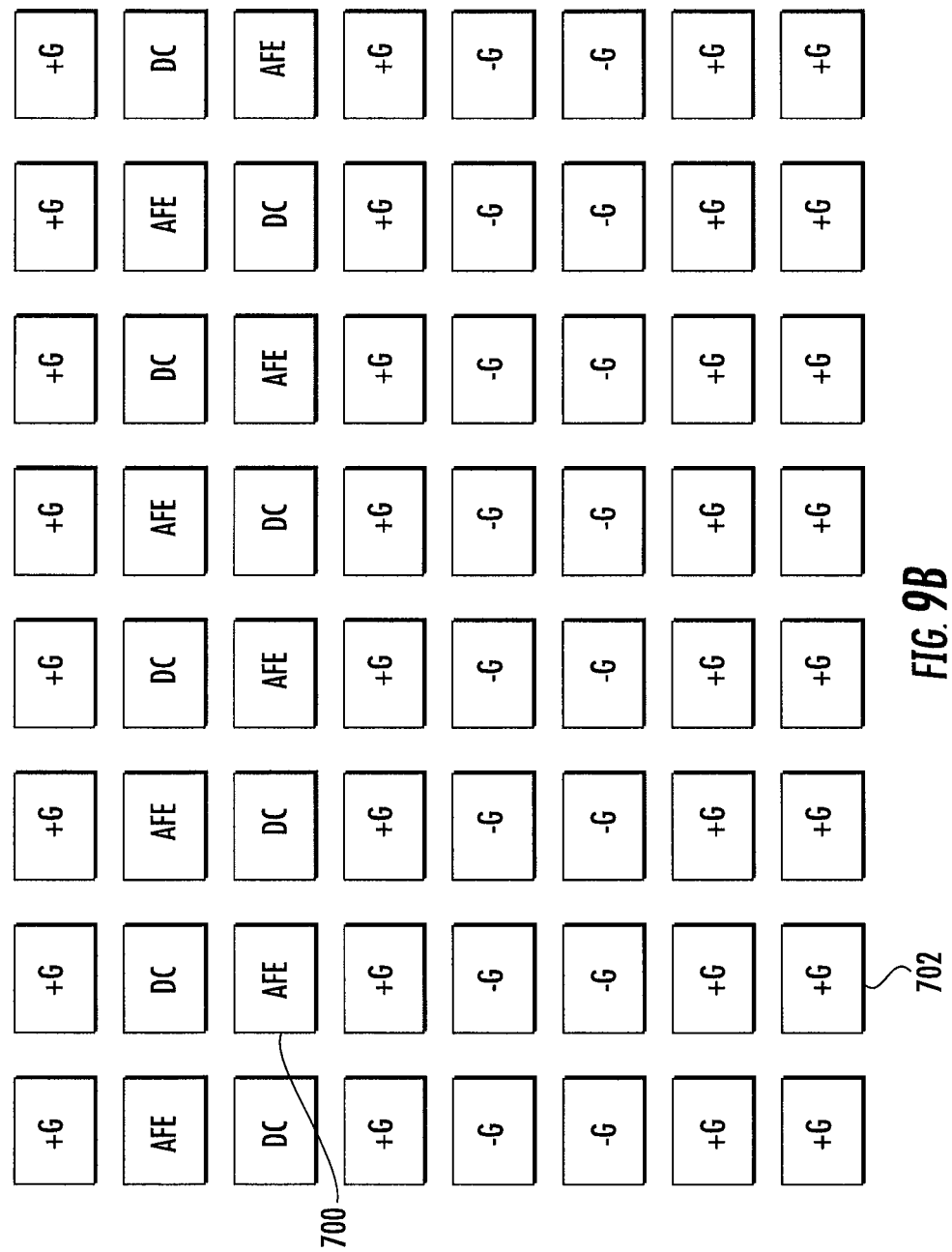

As illustrated in FIG. 9B, the first receiver electrode 700 disposed in the first column 702 is adjacent the Tx electrode (i.e., DC electrode) for capacitive sensing in the second period. The DC/AFE electrode pair disposed in the first column 702 is surrounded in the first column 702 by +G electrodes on which the guard signal (+G) is provided (or is electrically floating), thus shielding the trace 240 coupled to the first receiver electrode 700 that is routed below and parallel to the first column 702. As at least one +G electrode separates the −G electrode from the DC/AFE pair disposed in the first column 702, the −G signal does not cancel the transcapacitive response obtained between the DC/AFE electrode pair when an input object is in the sensing region.

After transcapacitive sensing during the second time period is complete, the method 1000 repeats utilizing the next row in the scanning sequence. For example, the timing module 250 changes the connections between the sensor electrodes 120 and the receiver and transmitter modules 260, 270 so that the first receiver electrode 700 illustrated the third row of sensor electrodes 120 in FIG. 9B is indexed to the fourth row of sensor electrodes 120 in FIG. 9C so that transcapacitive sensing may be performed during a third time period.

Figure 9C:
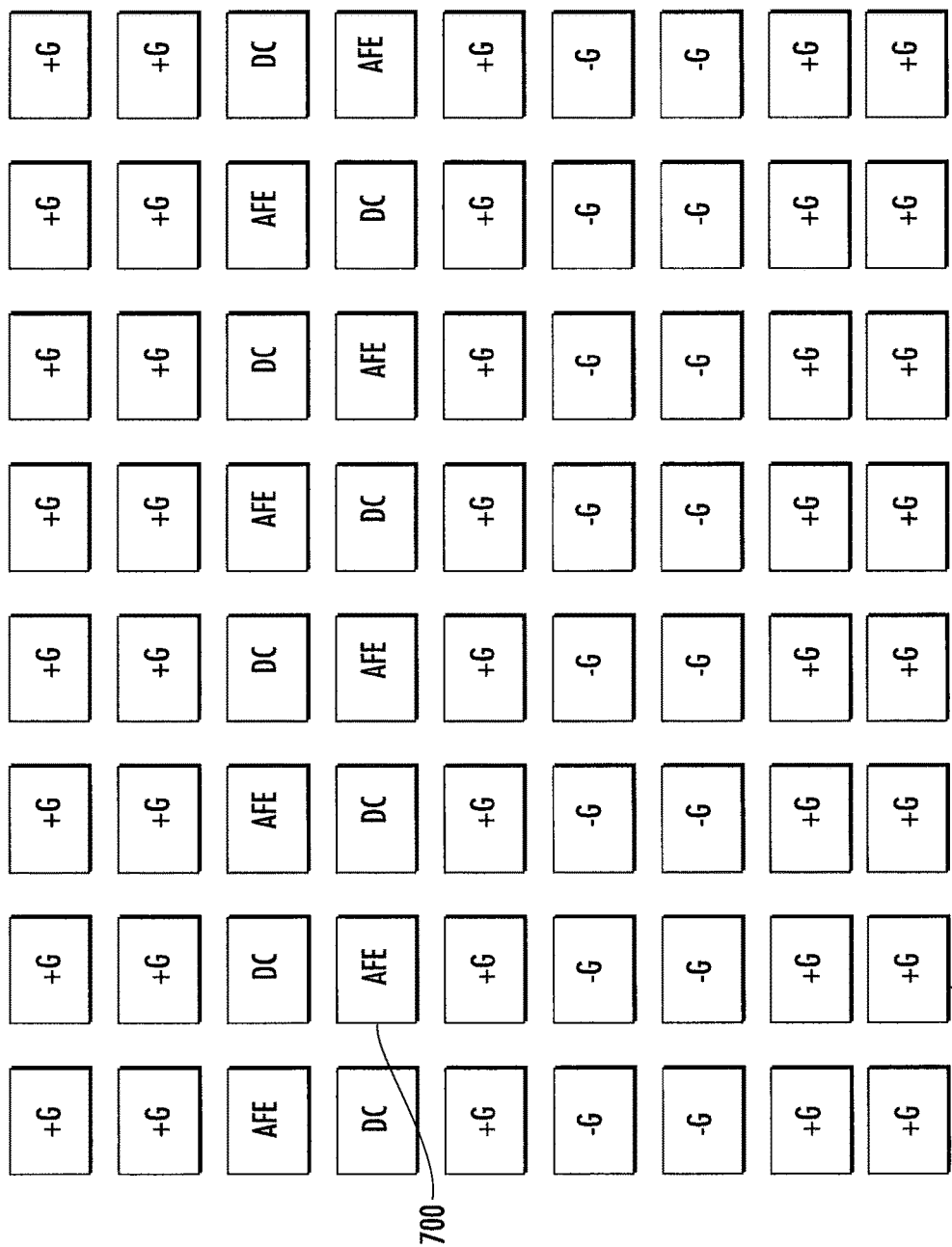
Figure 9E:
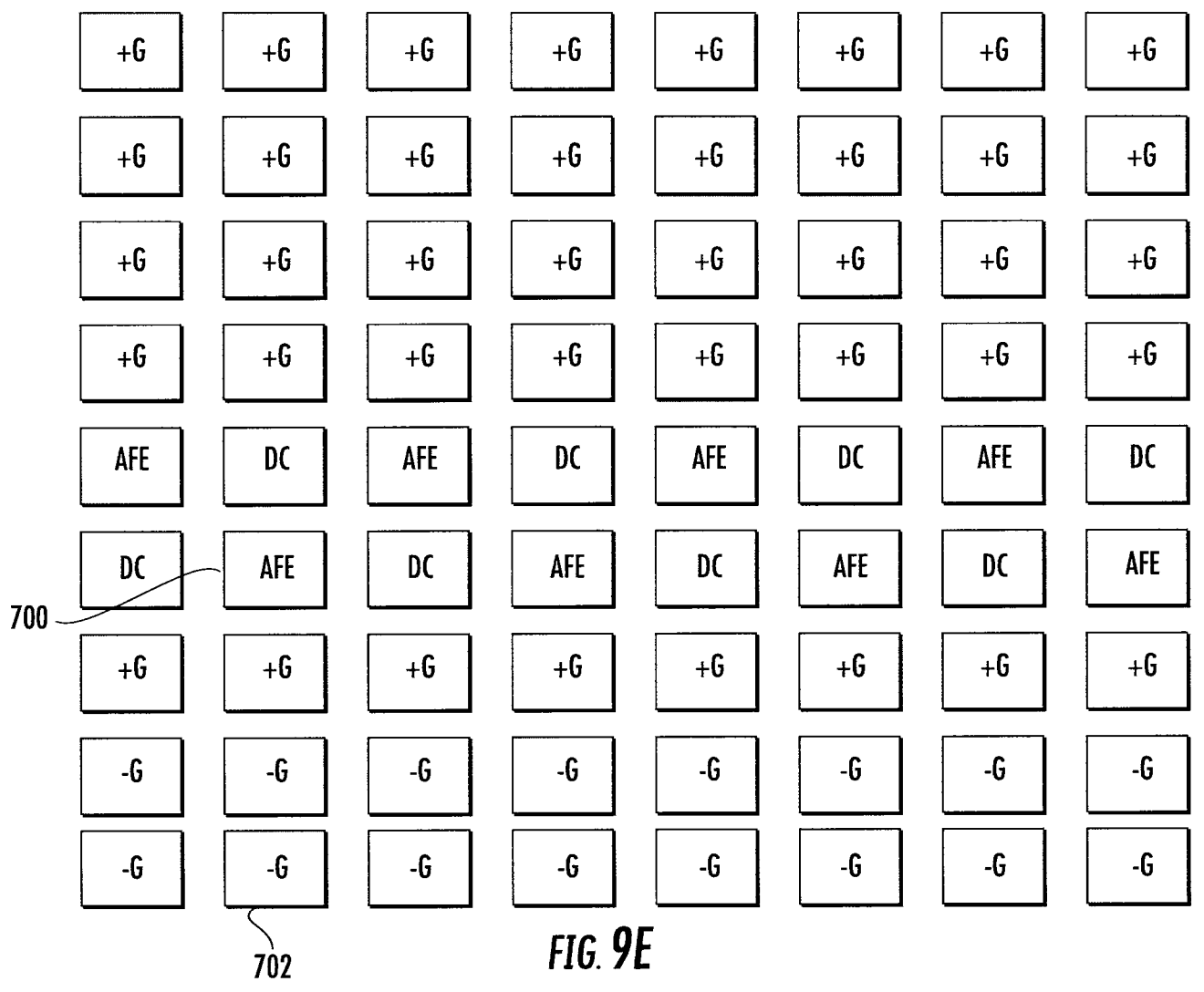

As illustrated in FIG. 9C, the first receiver electrode 700 disposed in the first column 702 is adjacent the Tx electrode (i.e., DC electrode) for capacitive sensing in the second period. The DC/AFE electrode pair disposed in the first column 702 is surrounded in the first column 702 by +G electrodes on which the guard signal (+G) is provided (or is electrically floating), thus shielding the trace 240 coupled to the first receiver electrode 700 that is routed below and parallel to the first column 702.

After transcapacitive sensing during the third time period is complete, the method 1000 repeats as shown in FIGS. 7D-E and so on until the entire first column 702 is scanned and a capacitive image is obtained.

Figure 11:
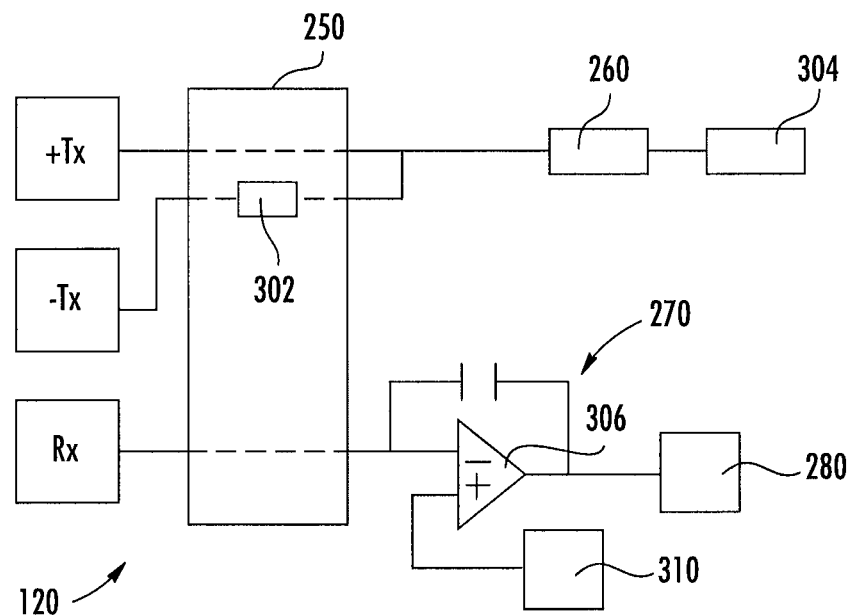
FIG. 11 is a simplified block diagram of another example of a processing system coupled to sensor electrodes of a portion of the array of sensor elements of FIG. 1.

FIG. 11 is a simplified block diagram of another example of a processing system 110 coupled to sensor electrodes 120 of a portion of the array of sensing elements 124 of FIG. 1. The processing system 110 of FIG. 11 is configured to modulate the receiver sensor electrodes relative to the transmitter sensor electrodes for transcapacitive sensing. Similar to as illustrated in FIGS. 3 and 5, three sensor electrodes 120 shown in FIG. 11 are labeled Rx, +Tx, and −Tx. The sensor electrodes 120 labeled +Tx and −Tx are utilized as transmitter (Tx) electrodes and are coupled to the transmitter module 260 through the timing module 250. The transmitter module 260 is coupled to a non-modulated signal generator 304 or positive voltage rail, that produces a non-modulated signal (i.e., ground, system ground, constant DC, etc.) to the −Tx and +Tx electrodes through the timing module 250. As stated above, the timing module 250 selects which of the sensor electrodes 120 will be utilized as the −Tx and +Tx electrodes in accordance with a scanning or other sensing sequence.

The +Tx electrode is directly coupled through the timing module 250 to the transmitter module 260, such that the polarity signal output of transmitter module 260 is provided as a +Tx signal that has a positive continuous DC voltage. In one embodiment, the signal driven on the +Tx electrode by transmitter module 260 is a positive DC voltage, such as illustrated by the +Tx voltage plot of FIG. 12.

The −Tx electrode is coupled through the timing module 250 and a voltage inverter 302 to the transmitter module 260, such that the polarity of signal output from the of transmitter module 260 is inverted. For example, the positive +Tx signal outputted by the transmitter module 260 is inverted to a negative −Tx signal. The −Tx signal has a negative continuous DC voltage that has an absolute value substantially equal to the voltage of the +Tx signal. In one embodiment, the signal driven on the −Tx electrode by transmitter module 260 is a negative DC voltage, such as illustrated by the −Tx voltage plot of FIG. 12. Alternatively, the −Tx signal may be provided by a separate voltage rail without the use of an inverter.

The sensor electrode 120 labeled Rx is utilized as a receiver (Rx) electrode and is coupled to the receiver module 270 through the timing module 250. As discussed above, the receiver module 270 includes an analog front end (AFE) 306. A positive input of the AFE 306 is coupled to a modulated signal generator 310. The negative input of the AFE 306 is coupled to the Rx electrode through the timing module 250 and receives the resulting signals during transcapacitive sensing. The timing module 250 selects which of the sensor electrodes 120 will be utilized as the Rx electrode in accordance with a scanning or other sensing sequence. The modulated signal generator 310 provides a modulated signal to the AFE 306, which in turn causes the AFE 306 to modulate the Rx electrode relative to the +Tx and −Tx electrodes. In one embodiment, the signal driven on the Rx electrode by transmitter module 260 may be a square wave, such as illustrated by the Rx voltage plot of FIG. 12. An output of the AFE 306 is coupled to the determination module 280. The timing module 250 may also determine which +Tx and −Tx electrodes, if any, are placed in an electrically floating condition.

Figure 13:
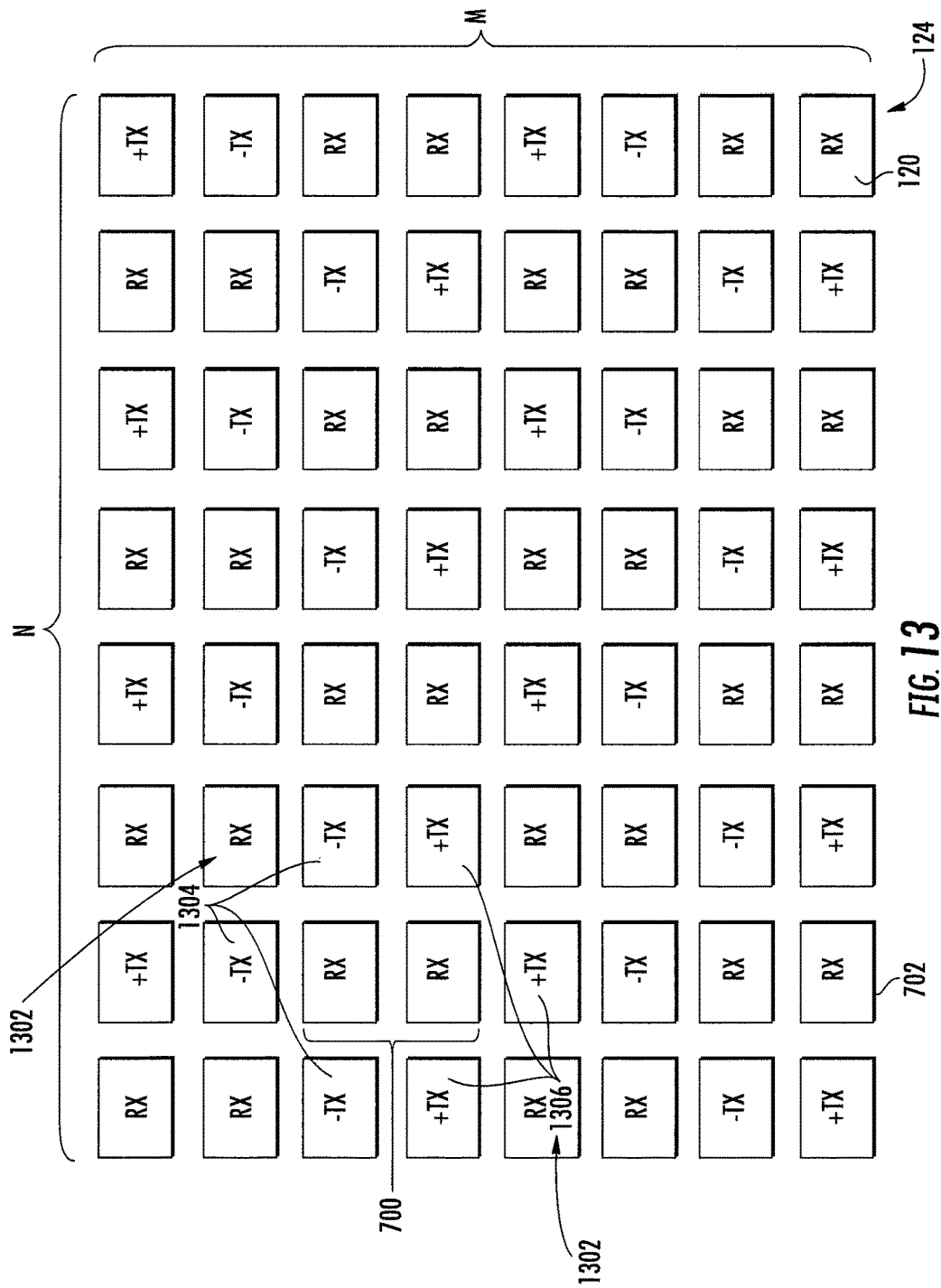
FIG. 13 illustrates a signal map of signals applied to a simplified exemplary array of sensor elements the array is used to perform transcapacitive sensing.
Figure 14:
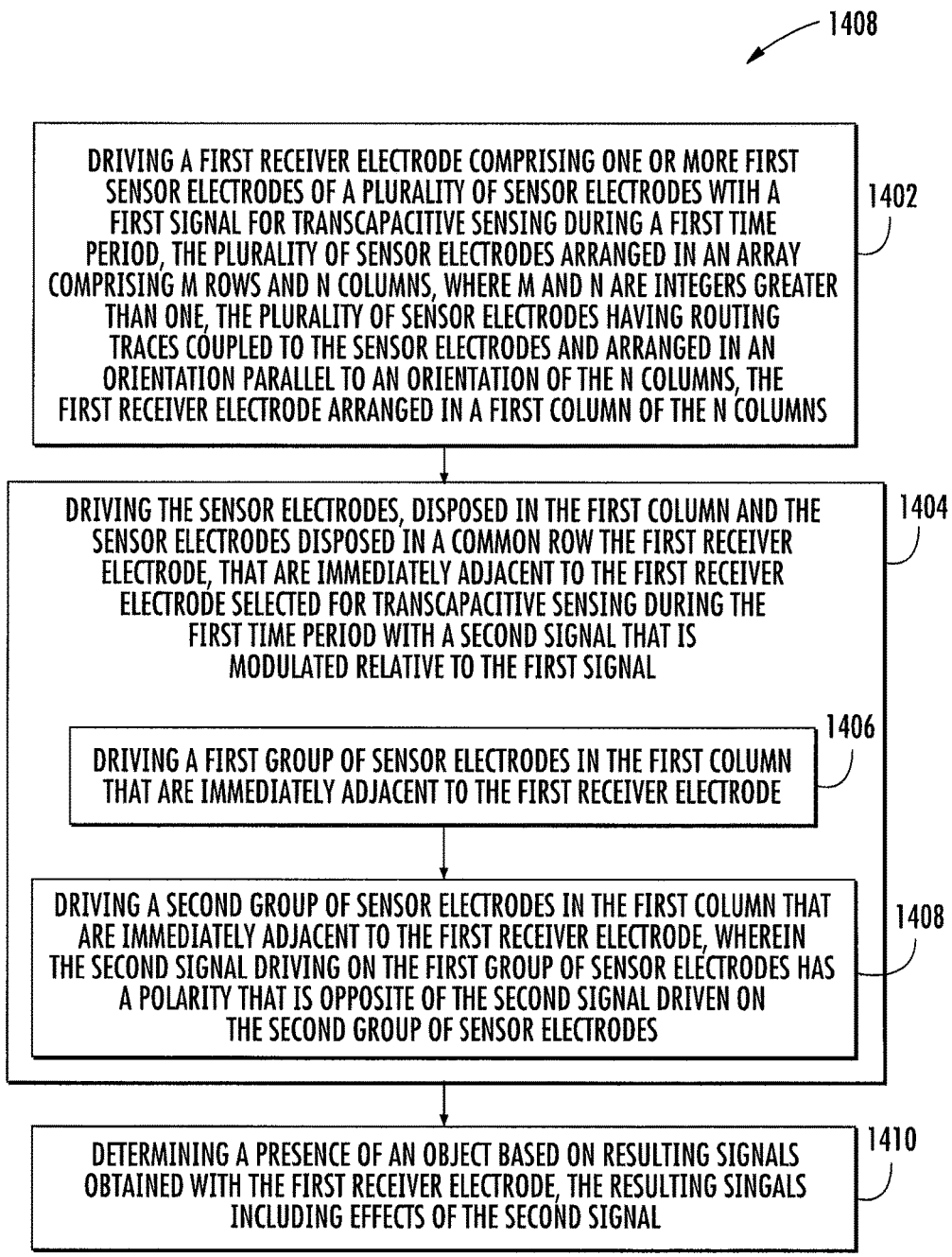
FIG. 14 is a block diagram of an exemplary method for transcapacitive sensing corresponding at least to the signal map illustrated in FIG. 13.

FIG. 13 illustrates a signal map of signals applied to a simplified exemplary array of sensing elements 124 during different time periods while the array is scanned to perform transcapacitive sensing. The transcapacitive sensing may be performed with either of the processing system 110 illustrated in FIG. 11, or other suitable processing system. FIG. 14 is a block diagram of an exemplary method 1400 for transcapacitive sensing corresponding at least to the signal map illustrated in FIG. 13 while utilizing the processing system 110 illustrated in FIG. 11. Although the processing system 110 illustrated in FIG. 11 modulates the Rx voltage, it is contemplated that the method 1400 may also be utilized with processing systems that modulate the Tx voltage while maintaining the Rx voltage at a steady voltage.

Referring to both FIGS. 13 and 14, the method 1400 begins at operation 1402 by driving receiver electrodes (Rx electrode) 700 comprising pairs comprising at least two or more immediately adjacent sensor electrodes 120 of a plurality of sensor electrodes 120 with a first signal (Rx) for transcapacitive sensing during a first time period. Each time period of the method 1400 refers to a single portion of a scanning sequence in which the entire array of sensing elements 124 are scanned. Other pairs of sensor electrodes 120 that receive the first signal are also identified with the label Rx in FIG. 13.

As discussed above, plurality of sensor electrodes 120 are arranged in an array of sensing elements 124 comprising M rows and N columns. The plurality of sensor electrodes 120 have routing traces 240 coupled to the sensor electrodes 120 and arranged in an orientation parallel to an orientation of the N columns (as illustrated in FIG. 2). The Rx electrodes comprising the first pair of first receiver electrodes 700 are immediately adjacent each other and arranged in a first column 702 of the N columns. The first column 702 may also have additional pairs of first receiver electrodes 700 (i.e., pairs of adjacent Rx electrodes). Although the description of the method 1400 follows events relative to the first pair of first receiver electrodes 700 in the first column 702, the method 1400 is applicable to any of the pairs of Rx electrodes disposed in the first or other columns of the array of sensing elements 124.

At operation 1404, the sensor electrodes 120 disposed in the first column 702 and the sensor electrodes 120 disposed in a common row the first receiver electrode 700, that are immediately adjacent to the first pair of first receiver electrodes 700 selected for transcapacitive sensing during the first time period, are driven with a second signal (transmitter signal) that is modulated relative to the first signal. The sensor electrodes 120 that receive the second signal are identified by the labels +Tx and −Tx in FIG. 13.

At operation 1404, some of the sensor electrodes 120 that receive the second signal have a positive polarity while some of the sensor electrodes 120 that receive the second signal have a negative polarity. Thus, operation 1404 may be divided into a first sub-operation 1406 and a second sub-operation 1408.

Figure 12:
FIG. 12 are simplified signal diagrams corresponding to signals that may be driven on the sensor electrodes by the processing system illustrated in FIG. 10.
Figure 12:
Figure 12:

At the first sub-operation 1406, a first group 1304 of sensor electrodes 120 that are immediately adjacent (i.e., within the same column or row) to at least one of the sensor electrodes 120 comprising the first pair of first receiver electrodes 700 are driven with the second signal at a negative polarity, such as the −Tx signal illustrated in FIG. 12. The sensor electrodes 120 comprising the first group 1304 are adjacent each other, such that no intervening electrodes 120 having an opposite polarity (i.e., a +Tx signal) are disposed therebetween. Optionally, one or more, but not all, of the sensor electrodes 120 in the first group 1304 may be placed in an electrically floating condition.

At the second sub-operation 1408, a second group 1306 of sensor electrodes 120 that are immediately adjacent (i.e., within the same column or row) to at least one of the other sensor electrodes 120 comprising the first pair of first receiver electrodes 700 are driven with the second signal at a positive polarity, such as the +Tx signal illustrated in FIG. 12. The sensor electrodes 120 comprising the second group 1306 are adjacent each other, with no intervening electrodes 120 having an opposite polarity (i.e., a −Tx signal) are disposed therebetween. Optionally, one or more, but not all, of the sensor electrodes 120 in the second group 1306 may be placed in an electrically floating condition.

As at least one +Tx or −Tx electrode separates the pair of first receiver electrode 700 from adjacent Rx electrodes, the good positional detection is enabled in both the direction of the rows and the direction of the columns. In this manner, transcapacitive in the direction of the rows and columns may be readily performed. Furthermore, the use of opposite polarities on the +Tx and −Tx electrodes within the first column 702 balances the total charge provided to the AFE 306 while obtaining a baseline is reduced, thereby reducing size and cost requirements of the AFE 306.

At operation 1410, a presence of an input object is determined based on resulting signals obtained with the first receiver electrode 700 during the first time period. The resulting signals include effects of the second signal and are provided as sensing date to the determination module 280 for processing. Since the first Rx signal is modulated relative to the Tx signal, the difference in voltage driven on the Rx and Tx electrodes 120 allows transcapacitive sensing to be performed utilizing the resulting signals provided as an input to the AFE 306 while minimizing parasitic capacitance between electrodes in the first column 702 and the trace 240 coupled to the first receiver electrode 700. Thus, the method 1400 yields more accurate transcapacitive sensing results with reduced need for costly noise mitigation techniques due to improved signal to noise ratios.

While transcapacitive sensing during the first time period is being performed in the first column 702 with the first receiver electrode 700, transcapacitive sensing may be performed in other locations throughout the array of sensing elements 124. After transcapacitive sensing during the first time period is complete, the method 1400 optionally repeats utilizing the Rx electrodes in different positions, wherein the Rx pair includes at least one new sensor electrode 120 so that transcapacitive sensing may be performed during a second time period. For example, the timing module 250 changes the connections between the sensor electrodes 120 and the receiver and transmitter modules 260, 270 so that the pair of electrodes comprising the first receiver electrode 700 illustrated in FIG. 13 includes at least one different sensor electrode 120 and optionally excludes at least one sensor electrode 120 previously included in the pair. In another example, the timing module 250 changes the connections between the sensor electrodes 120 and the receiver and transmitter modules 260, 270 so that the pair of electrodes comprising the first receiver electrode 700 illustrated in FIG. 13 excludes at least one sensor electrode 120 previously included in the pair and optionally includes at least one different sensor electrode 120.

As illustrated in FIG. 13, the first receiver electrode 700 disposed in the first column 702 is adjacent the Tx electrode (i.e., DC electrode) for capacitive sensing in the second period. The DC/AFE electrode pair disposed in the first column 702 is surrounded in the first column 702 by G electrodes on which the guard signal (+G) is provided, thus shielding the trace 240 coupled to the first receiver electrode 700 that is routed below and parallel to the first column 702.

After transcapacitive sensing during the second time period is complete, the method 1400 may optionally repeat until the entire first column 702 is scanned or a desired capacitive image is obtained.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A processing system for transcapacitive sensing, the processing system comprising:
   a transmitter module configured to drive a first signal on a plurality of sensor electrodes arranged in an array comprising M rows and N columns, wherein M and N are integers greater than one, wherein routing traces coupled to the sensor electrodes are oriented parallel to and below the N columns, and wherein each sensor electrode of the plurality of sensor electrodes is coupled to a unique one of the routing traces;
   a receiver module configured to:
      drive a second signal on the plurality of sensor electrodes; and
      receive resulting signals from the plurality of sensor electrodes comprising effects of the first signal driven on the plurality of sensor electrodes, one of the first signal and the second signal is modulated relative to the other of the first signal and the second signal; and
   a timing module configured to:
      select a first receiver electrode for coupling to the receiver module for transcapacitive sensing, the first receiver electrode comprising one or more first sensor electrodes of the plurality of sensor electrodes arranged in a first column of the N columns;
      couple at least one of the sensor electrodes disposed in the first column and the sensor electrodes disposed in a row of the M rows that includes the first receiver electrode, that are immediately adjacent to the first receiver electrode with a third signal that is not modulated relative to the second signal, wherein the first, second and third signals are driven simultaneously during a first period;
      couple a first group of sensor electrodes arranged in the first column that are not included in the first receiver electrode with a first guard signal during the first period that is not modulated relative to the second signal; and
      couple a second group of sensor electrodes arranged in the first column that are not included in the first receiver electrode or in the first group of sensor electrodes with a second guard signal during the first period, the first and second guard signals having an opposite polarity.

2. The processing system of claim 1, wherein during a second period the timing module is further configured to:
   select a second receiver electrode for coupling to the receiver module for transcapacitive sensing, the second receiver electrode comprising one or more sensor electrodes of the plurality of sensor electrodes arranged in the first column, the second receiver electrode comprising at least one sensor electrodes that is different than the sensor electrodes comprising the first receiver electrode;
   drive a fourth signal on the second receiver electrode; and
   couple the sensor electrodes in a second column immediately above and below the second receiver electrode with a fifth signal that is not modulated relative to the fourth signal.

3. The processing system of claim 1, wherein the receiver module is further configured to modulate the first receiver electrode during the first period.

4. The processing system of claim 1, wherein the transmitter module is further configured to modulate one or more second sensor electrodes of the plurality of sensor electrodes during the first period.

5. The processing system of claim 1, wherein during the first period the timing module is further configured to:
   select at least two adjacent first sensor electrodes of the plurality of sensor electrodes arranged in the first column.

6. The processing system of claim 5,
   wherein the first group and the second group of sensor electrodes are immediately adjacent the first receiver electrode.

7. The processing system of claim 5, wherein during the first period the timing module is further configured to:
   couple at least two adjacent sensor electrodes of the plurality of sensor electrodes arranged in the first column and separated from the two adjacent first sensor electrodes by at least one sensor electrode with a signal that is not modulated relative to the second signal.

8. The processing system of claim 1, wherein during the first period the timing module is further configured to:
   couple the sensor electrodes in the first column with a fourth signal having a polarity opposite of a polarity the first signal, the sensor electrodes coupled with the fourth signal immediately adjacent the sensor electrodes coupled with the first and second signals.

9. A processing system for transcapacitive sensing, the processing system comprising:
   a transmitter module configured to drive a first signal on a plurality of sensor electrodes arranged in an array comprising M rows and N columns, wherein M and N are integers greater than one, wherein routing traces coupled to the sensor electrodes are oriented parallel to and below the N columns, and wherein each sensor electrode of the plurality of sensor electrodes is coupled to a unique one of the routing traces;
   a receiver module configured to:

drive a second signal on the plurality of sensor electrodes; and receive resulting signals from the plurality of sensor electrodes comprising effects of the first signal driven on the plurality of sensor electrodes, one of the first signal and the second signal is modulated relative to the other of the first signal and the second signal; and a timing module configured to:

select a first receiver electrode for coupling to the receiver module for transcapacitive sensing, the first receiver electrode comprising one or more first sensor electrodes of the plurality of sensor electrodes arranged in a first column of the N columns;

couple a first sensor electrode of the plurality of sensor electrodes disposed in the first column and the sensor electrodes disposed in a row of the M rows that includes the first receiver electrode, that are immediately adjacent to the first receiver electrode with a third signal that is not modulated relative to the second signal, wherein the first, second and third signals are driven simultaneously during a first period;

couple a second sensor electrode of the plurality of sensor electrodes disposed in a row of the M rows in common with the first receiver electrode and disposed in a second column of the N columns adjacent to the first column with the second signal; and couple a third sensor electrode of the plurality of sensor electrodes disposed in the row in common with the first receiver electrode and disposed in a third column of the N columns disposed between to the first column and the second column with a fourth signal that is not modulated relative to second signal.

10. The processing system of claim 9, wherein during the first period the timing module is further configured to:

couple the sensor electrodes disposed in a common column with the first receiver electrode that are immediately adjacent to the first receiver electrode selected for transcapacitive sensing with fourth signal that is not modulated relative to the second signal.

11. An input device comprising:

a plurality of sensor electrodes arranged in an array comprising M rows and N columns, where M and N are integers greater than one;

routing traces coupled to the sensor electrodes and arranged in an orientation parallel to an orientation of the N columns, each sensor electrode coupled to a unique one of the routing traces;

a processing system configured to:

drive a first receiver electrode comprising one or more first sensor electrodes of the plurality of sensor electrodes with a first signal for transcapacitive sensing, the first receiver electrode arranged in a first column of the N columns;

drive at least one of the sensor electrodes disposed in the first column and the sensor electrodes disposed in a common row with the first receiver electrode, that are immediately adjacent to the first receiver electrode selected for transcapacitive sensing with a second signal that is not modulated relative to the first signal, the first and second signals simultaneously driven during a first period;

couple a first group of the sensor electrodes with a first guard signal that is not modulated relative to the second signal;

couple a second group of sensor electrodes with a second guard signal that has a polarity opposite of the first guard signal, wherein the first group and the second group of sensor electrodes are immediately adjacent the first receiver electrode, and reside either in the first column or in a row in common with the first receiver electrode; and determine a presence of an object based on resulting signals obtained with the one or more first sensor electrodes.

12. The input device of claim 11, wherein each of the routing traces coupled to the sensor electrodes disposed in the first column of the N columns extends below all of the sensor electrodes comprising of the N columns.

13. The input device of claim 11, wherein the processing system is further configured to:

drive the sensor electrodes disposed in the first column that are not immediately adjacent to the first receiver electrode during the first period with a third signal having a polarity opposite of the second signal.

14. A method for transcapacitive sensing, the method comprising:

driving a first receiver electrode comprising one or more first sensor electrodes of a plurality of sensor electrodes with a first signal for transcapacitive sensing during a first time period, the plurality of sensor electrodes arranged in an array comprising M rows and N columns, where M and N are integers greater than one, the plurality of sensor electrodes having routing traces coupled to the sensor electrodes and arranged in an orientation parallel to an orientation of the N columns, the first receiver electrode arranged in a first column of the N columns;

driving at least one of the sensor electrodes disposed in a common row with the first receiver electrode, that is immediately adjacent to the first receiver electrode selected for transcapacitive sensing during the first time period with a second signal that is not modulated relative to the first signal;

driving a first group of the sensor electrodes disposed in the first column, that are immediately adjacent to the first receiver electrode during the first time period with the second signal;

driving a second group of sensor electrodes in the first column, that are immediately adjacent to the first receiver electrode during the first time period with a third signal, wherein the third signal has a polarity that is opposite a polarity of the second signal; and determining a presence of an object based on resulting signals obtained with the first receiver electrode.

15. The method of claim 14 further comprising:

driving at least one of the sensor electrodes disposed in the first column that are not immediately adjacent to the first receiver electrode with the third signal.

16. The method of claim 14 further comprising:

driving a second receiver electrode comprising one or more second sensor electrodes of the plurality of sensor electrodes with the first signal for transcapacitive sensing during the first time period, the second receiver electrode disposed in a first row of the M rows in common with the first receiver electrode; and driving the sensor electrodes disposed in a common column with the second receiver electrode and immediately adjacent to the second receiver electrode during the first time period with a signal that is not modulated relative to the first signal.

17. The method of claim 14, wherein driving the first receiver electrode with the first signal for transcapacitive sensing during the first time period further comprises:
- driving at least a first sensor electrode and a second sensor electrode of the plurality of sensor electrodes, wherein the first sensor electrode and the second sensor electrode are disposed in a common column.

18. The method of claim 14 further comprising:
- driving a second receiver electrode comprising one or more second sensor electrodes of the plurality of sensor electrodes with a fourth signal for transcapacitive sensing during a second time period, the second receiver electrode disposed in the first column, wherein the first receiver electrode and the second receiver electrode have at least one sensor electrode that is not included in both the first and second receiver electrodes; and
- driving sensor electrodes disposed in a common column with the second receiver electrode and immediately adjacent to the second receiver electrode during the second time period with a signal that is not modulated relative to the fourth signal.

* * * * *